(12) United States Patent
Liu et al.

(10) Patent No.: US 9,141,740 B2
(45) Date of Patent: Sep. 22, 2015

(54) METHODS, SYSTEMS, AND ARTICLES OF MANUFACTURE FOR IMPLEMENTING FULL-CHIP OPTIMIZATION WITH REDUCED PHYSICAL DESIGN DATA

(75) Inventors: Dongzi Liu, Fremont, CA (US); Oleg Levitsky, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 330 days.

(21) Appl. No.: 13/077,933

(22) Filed: Mar. 31, 2011

(65) Prior Publication Data

US 2012/0254818 A1     Oct. 4, 2012

(51) Int. Cl.
*G06F 9/455*     (2006.01)
*G06F 17/50*     (2006.01)

(52) U.S. Cl.
CPC .......... *G06F 17/505* (2013.01); *G06F 17/5068* (2013.01); *G06F 2217/84* (2013.01)

(58) Field of Classification Search
CPC  G06F 17/505; G06F 2217/84; G06F 17/5068
USPC ......... 716/104, 105, 118–131, 132, 133, 134, 716/135
See application file for complete search history.

(56) References Cited

U.S. PATENT DOCUMENTS

| | | | |
|---|---|---|---|
| 6,496,972 B1 * | 12/2002 | Segal | 716/103 |
| 6,578,183 B2 | 6/2003 | Cheong et al. | |
| 6,615,395 B1 | 9/2003 | Hathaway et al. | |
| 6,704,697 B1 | 3/2004 | Berevoescu et al. | |
| 7,000,206 B2 | 2/2006 | Kidd et al. | |
| 7,216,312 B2 | 5/2007 | Jain et al. | |
| 7,216,316 B1 | 5/2007 | Sutherland et al. | |
| 7,243,313 B1 * | 7/2007 | Qin et al. | 716/113 |
| 7,398,491 B2 | 7/2008 | Schaeffer et al. | |
| 7,606,692 B2 * | 10/2009 | Spadari et al. | 703/14 |
| 7,926,011 B1 | 4/2011 | Levitsky et al. | |
| 7,930,675 B2 | 4/2011 | Levitsky et al. | |
| 7,941,774 B2 * | 5/2011 | Luan et al. | 716/113 |

(Continued)

OTHER PUBLICATIONS

Non-Final Office Action dated Jun. 7, 2010 for U.S. Appl. No. 11/964,678.

(Continued)

*Primary Examiner* — Nha Nguyen
(74) *Attorney, Agent, or Firm* — Vista IP Law Group, LLP

(57) ABSTRACT

Disclosed are methods, systems, and articles of manufacture for implementing full-chip optimization across block boundaries with reduced physical design data. Some embodiments create a partial netlist and reduced physical data by identifying and including side instance(s) or side path(s) in the reduced physical data and then include or exclude side instance(s) or side path(s) in the reduced physical data. The method or the system may then perform full-chip optimization across individual block boundaries with the reduced physical data. Some embodiments further merge the post-optimization data back into the original data while reducing logic and physical disturbance to existing designs. Some embodiments anchor driver instance(s) that correspond to excluded side instance(s) or side path(s) to ensure LEC cleanliness and may further trim timing graph(s) based at least on the partial netlist. Some embodiments account for parasitics without static parasitic files. Various embodiments apply to both hierarchical and non-hierarchical designs.

36 Claims, 17 Drawing Sheets

(56) References Cited

U.S. PATENT DOCUMENTS

| | | |
|---|---|---|
| 8,151,229 B1 | 4/2012 | Chang et al. |
| 2005/0216875 A1* | 9/2005 | Zhang et al. .................... 716/9 |
| 2006/0112359 A1 | 5/2006 | Becer et al. |
| 2006/0248485 A1 | 11/2006 | Foreman et al. |
| 2007/0283305 A1 | 12/2007 | Reddy et al. |
| 2009/0044159 A1 | 2/2009 | Vinitzky et al. |
| 2009/0055787 A1 | 2/2009 | Oh et al. |
| 2009/0132982 A1 | 5/2009 | Kotecha et al. |
| 2010/0235799 A1* | 9/2010 | Rice et al. ..................... 716/8 |
| 2011/0173584 A1* | 7/2011 | Chen et al. .................... 716/108 |

OTHER PUBLICATIONS

Notice of Allowance dated Dec. 14, 2010 for U.S. Appl. No. 11/964,678.

* cited by examiner

METHODS, SYSTEMS, AND ARTICLES OF MANUFACTURE FOR IMPLEMENTING FULL-CHIP OPTIMIZATION WITH REDUCED PHYSICAL DESIGN DATA

CROSS-REFERENCE TO RELATED APPLICATION(S)

The instant application is related to U.S. application Ser. No. 11/964,678, entitled "METHOD AND SYSTEM FOR IMPLEMENTING TIMING ANALYSIS AND OPTIMIZATION OF AN ELECTRONIC DESIGN BASED UPON EXTENDED REGIONS OF ANALYSIS" and filed on Dec. 26, 2007. The contents of the U.S. application Ser. No. 11/964,678 are hereby expressly incorporated by reference in their entireties.

BACKGROUND

The recent advances in very deep sub-micron (VDSM) integrated circuits (ICs) have brought new challenges in the design closure methodologies of integrated systems. The use of more advanced process nodes, more functionality consolidation into a single die area, and increasing complexity due to, for example, hard IP usage have resulted in increased scale and complexity of electronic circuits. This also poses challenges on design closure that closes on an electronic design which takes a netlist of the electronic design and closes on the design to bring the electronic design to tapeout-readiness. For example, the use of memory has also increased due to the increased scale and complexity of electronic circuit designs and the incorporation of more functionality into a single die.

One approach to tackle the memory utilization problem is to use a hierarchical design methodology. A hierarchical electronic design includes a top level that is the highest hierarchical level in the hierarchy of the electronic design. A typical hierarchical electronic design methodology includes the steps of partitioning the electronic design into one or more blocks or sub-chips (hereinafter block), designing the top level and each block separately, assembling the block(s) into the top level, and trying to close on the entire design including interface timing. Conventional hierarchical approaches use black boxes or macro libraries to represent some or all of the blocks. Some approaches uses the interface logic model (ILM) to represent one or more blocks belonging to the top level and thus do not allow changes inside one or more of the blocks. Some other approaches uses active logic reduction technology (ART) that requires a full netlist, and thus the memory reduction is limited to reduced timing graph.

Thus, there exists a need for implementing full-chip optimization with reduced physical design data.

SUMMARY

What is needed is a method, a system, and a computer program product for implementing full-chip optimization with reduced physical design data. In some embodiments, the method and the system may be applied to flat electronic circuit designs. In some embodiments, the method and the system may be applied to hierarchical electronic designs, each of which includes a plurality of hierarchical levels. In these embodiments, a hierarchical methodology constitutes an extension of a flat design methodology, with the additional steps of top-level hierarchy exploration and partitioning, time budgeting, and chip assembly. It shall be noted that in conventional hierarchical design methodology, individual blocks may be required to be completed and even signed off. In some embodiments, the method and the system performs design optimization at the top level of the electronic design as well as at the block-level(s). In other words, the method and the system allows for optimization across the boundaries of the blocks.

In various embodiments, the method or the system further allows for optimization at both the top-level and the block-level concurrently to reduce the number of iterations to achieve closure, such as design closure or timing closure, on the electronic design. In some embodiments, the method or the system allows for optimization at both the top-level and the block-level concurrently. In some embodiments, the method and the system requires only a reduced set of physical design data to achieve various intended purposes. More details about the reduced set of physical design data will be provided in the Detailed Description section with reference to one or more drawing figures. In some embodiments, the method and the system requires only an incomplete or a partial netlist rather than a complete netlist as in the cases of some approaches adopting the active logic reduction technology. In these embodiments, the improvement in design closure is no longer limited to reduced timing graph but also includes additions, removal, or any other types of modifications and improvements to the entire electronic design. In various embodiments, the method and the system disclosed herein apply both to a new start-from-scratch design process as well as an ECO (engineering change order) design process.

In some embodiments, the method or the system for implementing full-chip optimization with reduced physical design data comprises the process or module for identifying an original set of design data of an electronic design. The method or the system may perform a full-chip optimization or design closure (hereinafter optimization) using a reduced set of physical design data and then merges changes made during the optimization process back to the original set of design data. In some embodiments where a hierarchical electronic design is under consideration, the method or the system may include the action or module for performing hierarchical exploration. For example, the method or the system may determine which block(s) should be partitioned and perform various syntheses and analyses such as the automatic floorplan synthesis and early rail analysis to gauge the feasibility of the top-level floorplan. The method or the system may further include the action or module for time budgeting in which the method or the system generates block-level timing constraint(s) for each individual block. The method or the system may then partition the design into one or more blocks and optionally optimizes and/or closes on individual block(s). Upon or shortly after the completion of the full-chip optimization using the reduced set of physical data, the method or the system may further assemble the full-chip assembly.

In some embodiments, the method and the system for implementing full-chip optimization with reduced physical design data may further include the action or module for generating the reduced physical data of the electronic design that are to be used in the action or module for performing full-chip optimization. In one more embodiments, the action or module for identifying the original set of design data of an electronic design may include the action or module for identifying placement information or data. In some embodiments, the method or the system may further include the action or module of identifying routing information or data. The routing information or data may be identified at various detail levels and will be explained in greater details in the subsequent paragraphs with reference to one or more figures. The method or the system may also include the action or module for identifying a block in the electronic design and the action or module for identifying or determining the physical design data-based interface logic model for the block in one or more embodiments. The method or the system may then generate the reduced physical design data that may be used for full-chip optimization.

More details about the method and system for implementing full-chip optimization with reduced physical design data will be provided in subsequent paragraphs with reference to one or more drawing figures.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAIL DESCRIPTION

Various embodiments of the invention are directed to a methods, systems, and articles of manufacture for implementing electronic circuit designs with electro-migration awareness in a single embodiment or in some embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments of the present invention encompasses present and future known equivalents to the components referred to herein by way of illustration.

Figure 1A:
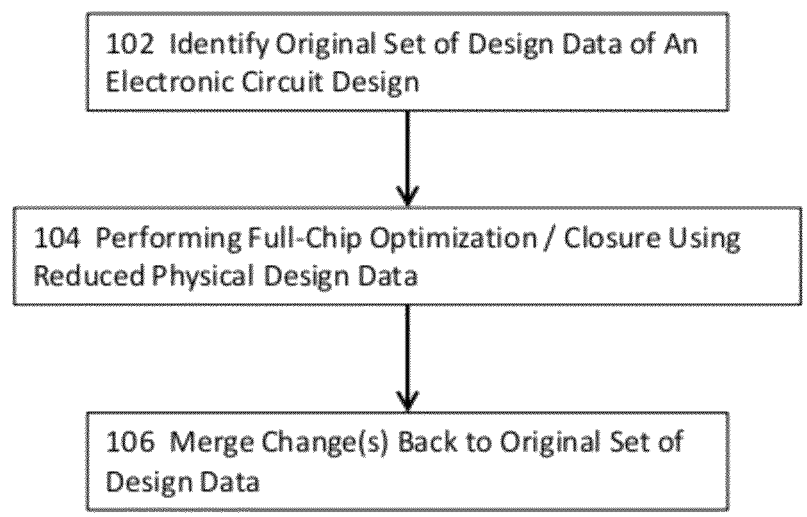
FIGS. 1A-B illustrate top level block diagrams for implementing various embodiments of the methods or systems for implementing full-chip optimization using reduced physical design data in some embodiments.

Referring to FIG. 1A which top level block diagrams for implementing various embodiments of the methods or systems for implementing full-chip optimization using reduced physical design data in some embodiments, the method or system comprises the process or module for identifying an original set of design data of an electronic design (102). In some embodiments, the original set of design data comprises the then existing netlist prior to the application of various processes of the method or the invocation of various modules of the system for implementing full-chip optimization with reduced physical design data. In some embodiments, the original set of design data comprises the then existing physical design data that may be extracted from the physical design (e.g., layout(s)) prior to the application of various processes of the method or the invocation of various modules of the system for implementing full-chip optimization with reduced physical design data.

In some embodiments, the original set of data is identified from the electronic design in the post-placement, pre-CTS (clock tree synthesis) stage. In these embodiments, ideal clock signals are used in the electronic design. In addition, because routing of the electronic design has not been done at the pre-CTS stage, trial route or virtual route information or data where the system or the method invokes the routing engine to determine the trial route or the virtual route based on the incomplete physical data or partial netlist at this stage in some embodiments. For example, the routing engine of the process or the system may determine the trial route or the virtual route to be the shortest Manhattan distance between two pins. In some embodiments, the method or the system may use the wire load model to determine the trial route or the virtual route although the RC values determined from the models using the shortest Manhattan distances between pins are more accurate than those determined from the wire load models in some cases. In some embodiments, the routing engine comprises a timing-aware routing engine that takes into account various timing constraints.

In some embodiments, the original set of data is identified from the electronic design in the post-placement, post-CTS stage. In these embodiments, the method or the system propagates the clock to minimize skews and insertion delays. In some embodiments where the clock needs to be divided, the method or the system performs separate analyses for the global skew and the local skew. In some embodiments, the method or the system may further comprise the action or module for performing clock tree optimization to reduce noise coupling to other signals by, for example, buffer sizing, gate sizing, buffer relocation, or level adjustment prior to identifying the original set of data in some embodiments. In addition, because routing of the electronic design is still not done at the post-CTS stage, trial route or virtual route information or data where the system or the method invokes the routing engine to determine the trial route or the virtual route based on the incomplete physical data or partial netlist at this stage in some embodiments. In some embodiments, the routing engine comprises a timing-aware routing engine that takes into account various timing constraints.

In some embodiments, the original set of data is identified from the electronic design in the post-placement, post-route stage. In these embodiments, the method or the system performs the global and detailed routing based on the then existing placement information and data prior to identifying the original set of data in some embodiments. In addition, because both the global and the detailed routing of the electronic design have been done at the post-route stage, detailed routing information or data may be extracted from the physical design at this stage in some embodiments. In some embodiments where signal integrity check has not been performed, the extracted routing data or information does not include the coupling effects. In some embodiments, the routing engine comprises a timing-aware routing engine that takes into account various timing constraints.

In some embodiments, the original set of data is identified from the electronic design in the post-placement, post signal-integrity check stage. In these embodiments, the method or the system performs the signal integrity check prior to identifying the original set of data in some embodiments. For example, the method and the system may perform various actions to check and fix signal integrity issues. For example, noises from various sources, such as the thermal noise, shot noise, and flicker noise for analog circuitry and the noises arising from switching of signals for digital circuitry, may be identified, and models for each noise event giving rise to the respective noise may be created, and simulation may be performed and analyzed to identify and fix signal integrity issues. In addition, both the global and the detailed routing of the electronic design have been done at the signal integrity check stage, and the coupling effects have been taken into account, detailed routing information or data with coupling effect may be extracted from the physical design at this stage in some embodiments. In some embodiments, the routing engine comprises a timing-aware routing engine that takes into account various timing constraints.

At 104, the method or the system for implementing full-chip optimization with reduced physical design data may further include the process or module for performing full-chip optimization using at least a reduced set of physical data that is less than the full set of physical design data that is available at the current stage of the electronic design in some embodiments. More details about the process or module for performing full-chip optimization and about the reduced set of physical design data will be provided in subsequent paragraphs with reference to one or more drawing figures. At 106, the method or the system may further comprise the process or module for merging the changes, which are determined during the full-chip optimization, back into the original set of design data in one or more embodiments. The design data, once merged with the changes determined during the full-chip optimization, include the intended changes that are determined during the full-chip optimization in these embodiments.

Figure 1B:
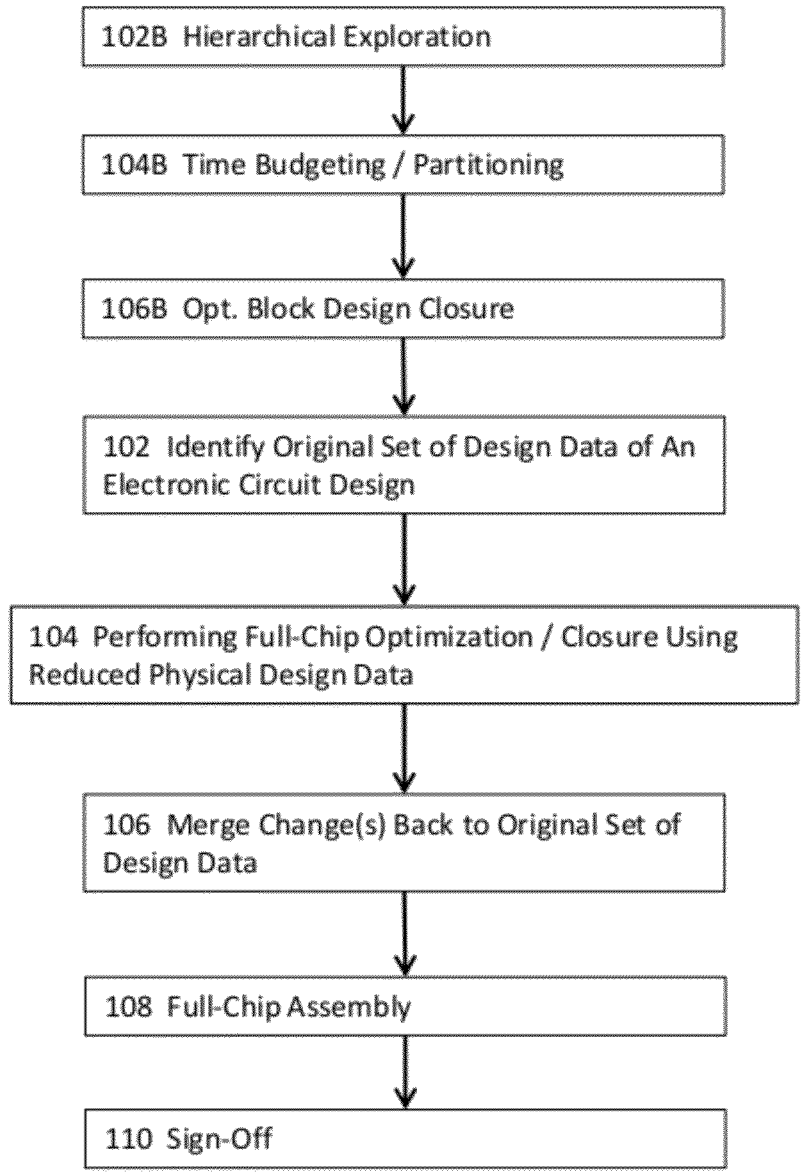

Referring to FIG. 1B which illustrates a top level block diagram for implementing various embodiments of the methods or systems for implementing full-chip optimization using reduced physical design data in some embodiments. More specifically, the electronic design that is being processed by the processes or modules as illustrated in the flow diagram of FIG. 1B comprises a hierarchical design with a plurality of hierarchical levels in these embodiments. The method or the system for implementing full-chip optimization with reduced physical design data comprises the process or module for performing hierarchical exploration to decide which blocks should be partitioned at 102B. In some embodiments, the method or the system may perform, for example but not limited to, automatic floorplanning synthesis for the hierarchical exploration to determine the feasibility of the top-level floorplan. In some embodiments, the method or the system may comprise performing early rail analysis to determine the feasibility of the top-level floorplan. In some embodiments, the method or the system may then perform partitioning the electronic design at 104B according to the top-level floorplan or the feasibility thereof determined at 102B. In some embodiments, the method or the system may further perform time budgeting at 104B to generate block-level timing constraints for each individual block after the top-level floorplan or the feasibility thereof has been determined at 102B and after the partitioning has been determined and committed at 104B.

At 106B, the method or the system may further optionally comprise the process or module for performing the block design closure for one or more of the blocks in some embodiments. In other words, the method or the system has the option to close on an individual block design before proceeding further to perform full-chip optimization in some embodiments. In one or more embodiments, the method or system comprises the process or module for identifying an original set of design data of an electronic design (102) in a similar manner as described in the preceding paragraphs with reference to FIG. 1A. At 104, the method or the system for implementing full-chip optimization with reduced physical design data may further include the process or module for performing full-chip optimization using at least a reduced set of physical data that is less than the full set of physical design data that is available at the current stage of the electronic design in a similar manner as described in the preceding paragraphs with reference to FIG. 1A in some embodiments. At 106, the method or the system may further comprise the process or module for merging the changes, which are determined during the full-chip optimization, back into the original set of design data in a similar manner as described as described in the preceding paragraphs with reference to FIG. 1A in one or more embodiments.

In some embodiments, the method or the system may further comprise the process or module for assembling the full-chip electronic design based on the design data determined at 104 and 106 and proceed to 110 for sign-off. It shall be noted that the methodology disclosed in FIG. 1B for a hierarchical electronic design constitutes an extension of a corresponding flat design methodology, with the additional processes of top-level exploration, partitioning, time budgeting, as well as chip assembly after the individual blocks have been implemented and signed off as described with reference to FIG. 1B.

Figure 2:
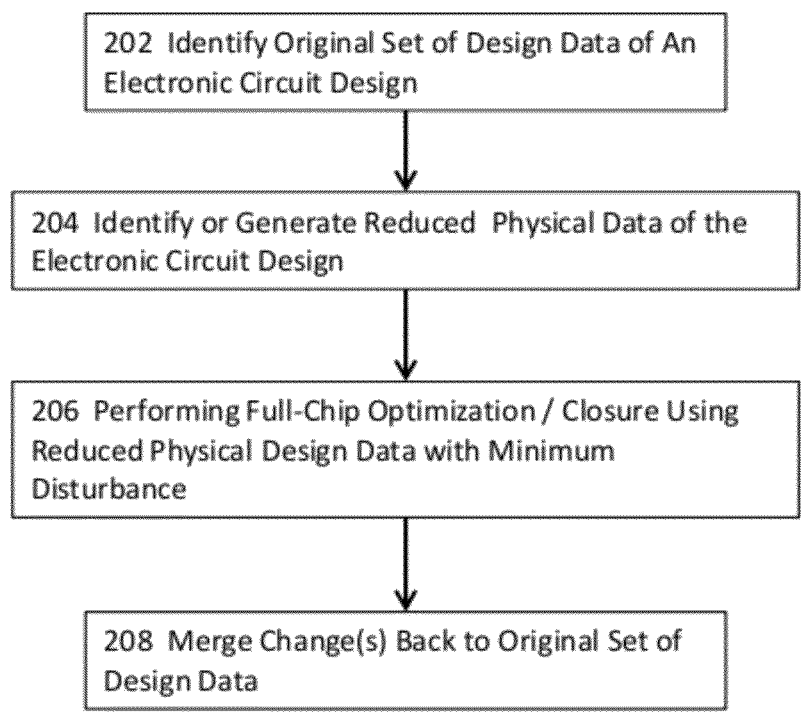
FIG. 2 illustrates more detailed block diagrams for the method or system for implementing full-chip optimization using reduced physical design data in some embodiments.

Referring to FIG. 2 which illustrates more detailed block diagrams for the method or system for implementing full-chip optimization using reduced physical design data in some embodiments, the method or system comprises the process or module for identifying an original set of design data of an electronic design (202) in a similar manner as described in the preceding paragraphs with references to FIG. 1A. The method or the system may further comprise the process or module for identifying or generating reduced physical data of the electronic design at 204 in one or more embodiments. At 206, the method or the system may further comprise the process or module for performing full-chip optimization using the reduced physical design data that are identified or generated at 204 in one or more embodiments. At 208, the method or the system may further comprise the process or module for merging one or more changes back to the original set of design data in one or more embodiments. In some embodiments, the process or module for merging one or more changes back to the original set of design data may be performed by adding the one or more changes to, appending the one or more changes to, removing some data from, or modifying the original set of design data in any necessary or desired manners to facilitate the completion of the electronic design for, for example, the eventual tapeout readiness. More details about the processes or modules of 204 and 206 will be provided in subsequent paragraphs with reference to various drawing figures.

According to the flow diagram illustrated in FIG. 2, the method or the system may first partition the hierarchical or non-hierarchical electronic design into a plurality of smaller blocks in some embodiments. In one or more embodiments, at least one of the plurality of blocks is sufficiently small such that the block may be optimized as a flat design. In some embodiments, the method or the system optionally closes on the at least one individual block by performing, for example, timing closure on the at least one individual block. Nonetheless, various embodiments disclosed herein do not require optimization or closure of the individual blocks prior to the performance of the full-chip optimization. Upon closure of the at least one individual block, the method or the system assembles the at least one individual blocks back into the top level and performs full-chip optimization to fix various issues in some embodiments. For example, the method or the system may perform the full-chip optimization by fixing, for example, timing violations or design rule violations in global paths and cross-partition connections. In some embodiments where the method or the system does not perform optimization for the individual blocks prior to assembling the individual blocks to the top level design for full-chip optimization and the method or the system determines that timing is not closed for the assembled electronic design, the method or the system may perform the full-chip optimization for the cross partition timing paths while preserving the hierarchical structure of the electronic design. It shall be noted that a cross partition timing path comprises a path that crosses the block boundary or a path that entirely lies at the top level and is not connected to any block boundaries of the electronic design.

In addition or in the alternative, some embodiments as described herein neither add nor delete partition pins and maintain the locations of the pins unchanged such that the full-chip optimization with reduced physical design data does not logically or physically disturb partition pins. In some embodiments, the method or the system also maintains the timing polarity of the partition pins. Moreover, various electronic circuit design tools, such as the placement tool or the routing tool, utilized in some embodiments constitute hierarch-aware tools. In some embodiments, the maintenance of the locations of pins together with the hierarchy-aware electronic circuit design tools ensure that various embodiments disclosed herein do not logically or physically disturb partition pins. In some embodiments, the method or the system anchors some drivers while keeping some instances and paths in the reduced physical design data and leaving some other instances or paths out of the reduced physical design data and uses hierarchy-aware electronic design tools to ensure that the individual blocks and/or their interfaces are not logically or physically disturbed when performing the full-chip optimization across the boundaries of individual blocks.

Moreover, the method or system operates on the partial, incomplete netlist or the reduced physical design data and therefore creates trimmed timing graph for only the paths of interest in some embodiments. In other words, the method or the system does not require the timing graph to cover the entire design but only the paths of interest while ensuring the availability of complete timing information of cross-partition paths in these embodiments. In some embodiments where a buffer or inverter pair is added logically to a block, the method or the system to ensure that the added buffer or inverter pair is physically placed within the block boundary. In some embodiments where the buffer or inverter pair is not placed within the block boundary initially, the method or the system may subsequently push it within the correct boundary of a block. In some embodiments where a buffer or inverter pair is added logically to the top level of the electronic design, the method or the system ensures that the buffer or inverter pair is placed at the top level outside the boundaries of individual blocks. If the method or the system determines that the added buffer or inverter pair is not placed at the top level outside the boundaries of individual blocks, the method or the system may then push the added buffer or inverter pair to the top level outside the boundaries of individual blocks in some embodiments. It shall be noted that various embodiments disclosed herein apply to both a flat electronic design and a hierarchical electronic design. The mention of "top level" throughout the entire disclosure does not explicitly or implicitly imply that the electronic design is a hierarchical design. Rather, the top level refers to the portion of the electronic design that is outside the individual blocks which are products of a design partitioning process.

Moreover, various embodiments disclosed herein create and use a partial, incomplete netlist while leaving some instances and paths out of the reduced physical design data or the complete netlist. In these embodiments, the method or the system keeps the instances and paths of interest in the reduced physical design data or the partial, incomplete netlist and creates a trimmed version of a complete timing graph that captures the cross partition block timing paths of interest. The method or the system may then perform the full-chip optimization by using at least such a trimmed timing graph or the reduced physical design data.

Figure 3:
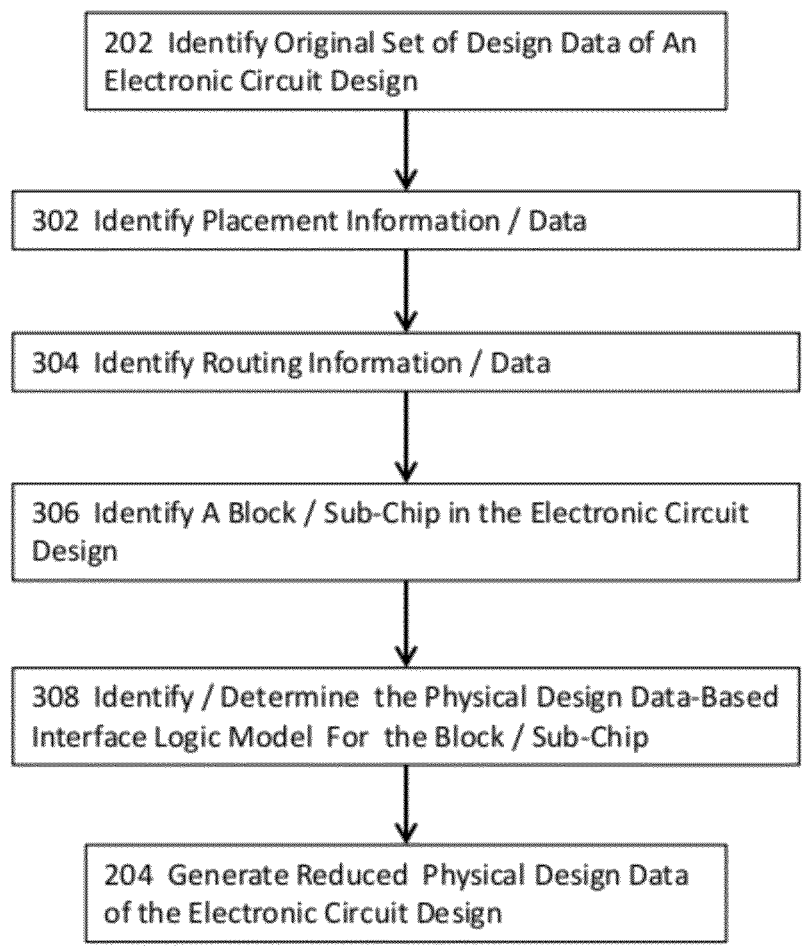
FIG. 3 illustrates more details for a part of the method or system for implementing full-chip optimization using reduced physical design data in some embodiments.

Referring to FIG. 3 which illustrates more details for a part of the method or system for implementing full-chip optimization using reduced physical design data in some embodiments, the process or the module for identifying an original set of design data of an electronic design may comprise the process or module for identifying placement information data or information at 302. In some embodiments, the method and the system operates in a post-placement domain during which one or more of the processes for pre-placement optimization, in-placement optimization, post-placement optimization but before CTS, and post-placement optimization after CTS.

For example, the method and the system may identify an optimized or improved netlist that has gone through the optimization before placement or some improved cell information or data (e.g., information or data for cells that are downsized during the pre-placement optimization) that are generated or modified during the pre-placement optimization in some embodiments. In addition or in the alternative, the method or the system may also identify the logic, one or more moved or resized cells, buffer insertion, net splitting, or gate duplication that are optimized or improved based on the virtual route or trial route during the in-placement optimization process in some embodiments. In addition or in the alternative, the method or the system may identify the setup time or hold time violations that are fixed during the post-placement optimization process in some embodiments. In addition or in the alternative, the method or the system may identify the timing information or data with propagated clock that are optimized during the post-placement and post-CTS optimization process due to the clock propagation in the clock tree synthesis process in some embodiments.

At 304, the method or the system for implementing full-chip optimization with reduced physical design data may further comprise the process or module for identifying routing information or data in one or more embodiments. In some embodiments where the electronic design has not gone through the global or detailed routing process, the method or the system may identify the trial route or virtual route information or data that are generated by using a routing engine to route the post-placement, pre-route electronic design with the post-placement data or the netlist then available. In some of these embodiments where trial route or virtual route data or information is first determined, the method or the system may further determine a correlation between the trial route or virtual route data or information and the actual global or detailed routing data or information once the global or detailed routing has been performed.

At 306, the method or the system for implementing full-chip optimization with reduced physical design data may further comprise the process or module for identifying a block in the electronic design in one or more embodiments. In some embodiments, a block may be as simple as an IP (intellectual property) block, a macro block, or a portion thereof. In some embodiments, a block comprises one of a plurality of partitions of the electronic design that is divided or partitioned according to some rules or constraints.

For example, the method or the system may partition a mixed signal electronic circuit into one single digital partition and a plurality of analog partitions, each of which defines the boundaries identified by a controlled signal from controlled voltage source(s) that represents an infinite impedance between two nodes or a driven signal whose potential is not affected by flow into a connecting component. As another example, a hierarchical electronic design may be partitioned in a way that the hierarchical electrical design is registered at the block level where the last element at the block level before the block boundary is register in some embodiments. This partitioning scheme is more lenient when the block level data are not or cannot be optimized or when a designer uses a block-box model or an interface logic model (ILM) to replace one or more blocks in the electronic design. Another partitioning example is to partition the electronic design such that there exists some combinational logic between the last register or the first register and the block boundary in some embodiments. In these embodiments, various processes or modules described herein also optimize such combinational logic between the register and the boundary during the full-chip optimization. Various other circuit partitioning schemes may also be used and are considered as within the grasp of one of ordinary skill in the art. These partitioning schemes thus shall not be considered to limit the scope of various other embodiments.

At 308, the method or the system for implementing full-chip optimization with reduced physical design data may further comprise the process or module for identifying or determining an interface logic model that is based on the physical design data (physical design data-based ILM) for the block that is identified at 306 in some embodiments. Unlike usual ILMs that only contains interface logic of the block and shows the entire path (clock to clock path) at the top level for the block's interface nets, the physical design data-based ILM is determined based on and incorporates at least some of the physical design data that are available at the current stage of the electronic design in some embodiments. For example, a physical design data-based ILM may be determined from the data in the LEF/DEF (Library Exchange Format/Design Exchange Format) files in some embodiments. Similarly, a physical design data-based ILM may also be similarly determined based on the Milkyway format design file(s) that contain data or information about cell layouts sufficient for placement or routing in some embodiments. In some embodiments, the method or the system may further comprise the process or module for replacing the block with its corresponding physical design data-based ILM. Upon or shortly after the identification or determination of the physical design data-based ILM, the method or the system may then proceed to 204 which has been described in the preceding paragraph(s).

Figure 4:
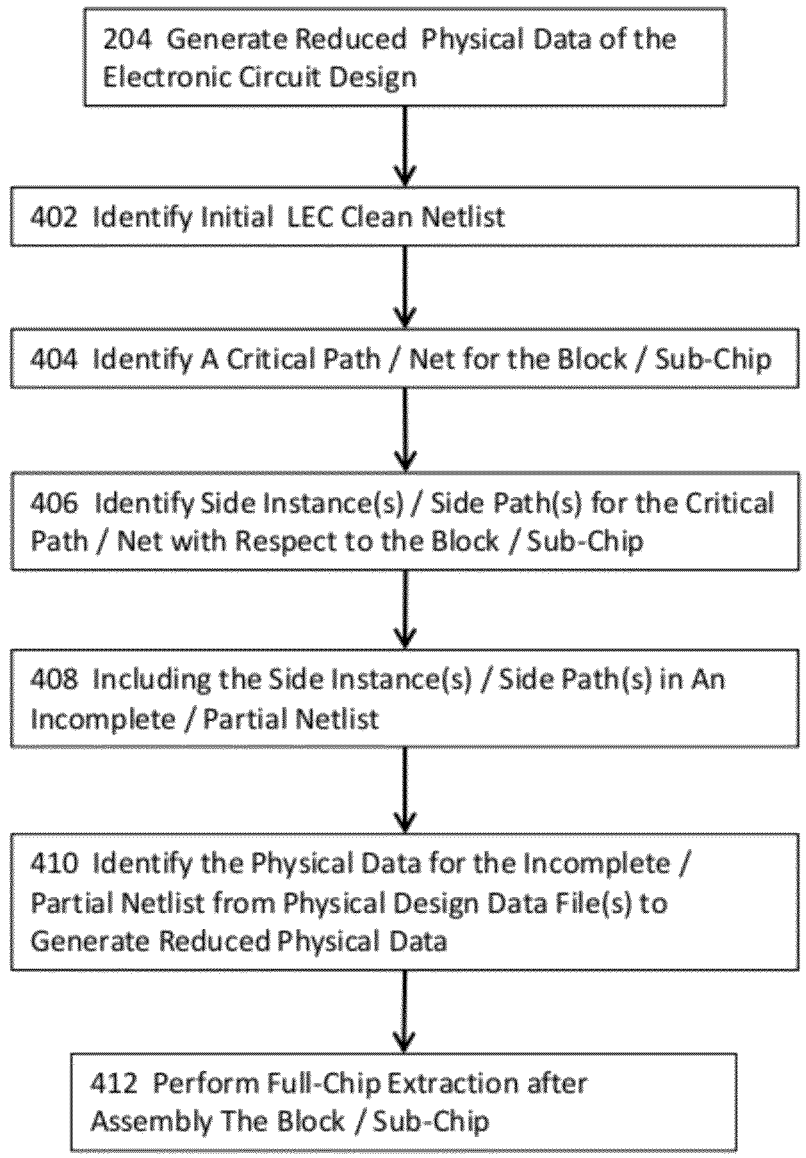
FIG. 4 illustrates more details for a part of the method or system for implementing full-chip optimization using reduced physical design data in some embodiments.

Referring to FIG. 4 which illustrates more details for a part of the method or system for implementing full-chip optimization using reduced physical design data in some embodiments, the method or the system for generating reduced physical data of the electronic design may further comprise the process or module for identifying an LEC (logic equivalence check) clean netlist at 402 in one or more embodiments. In some embodiments, various processes and modules produce LEC-clean results so the designer need not worry about or perform logic equivalence check after the full-chip optimization is performed although various embodiments do not necessarily prevent a designer from performing the LEC as an extra assurance.

At 404, the method or the system may further comprise the process or module for identifying a critical path or net for the block in some embodiments. For example, a path or a net with a gate or a driver driving multiple loads (e.g., multiple fan-outs) may be determined or identified as a critical path or net in some embodiments because any changes in the number of fan-outs may result in logic or timing that is different from the intended value. At 406, the method or the system may further comprise the method or the process for identifying one or more side instances or one or more side paths for the critical path or net with respect to the block in some embodiments.

A side instance comprises a non-critical instance to be included in the reduced physical design data to ensure timing accuracy or quality of resilience (QoR) convergence in one or more embodiments. A side path comprises a non-critical path to be included in the reduced physical design data to ensure timing accuracy or quality of resilience (QoR) convergence in one or more embodiments. In some embodiments, a side path constitutes the timing path through a side instance all the way to a register. In the previous example of a logic gate or buffer (hereinafter driver) driving multiple fan-outs, it is likely that a designer is interested in only some but not all of these multiple fan-outs for the full-chip optimization across the interface of the block. In this example, the instances (e.g., logic gates, buffers, etc.) that contribute to the accurate determination of the pin capacitances will be identified or determined as the side instances, and the paths routing through or to these instances to the respective registers will be identified or determined to be the side paths in some embodiments.

In some embodiments where the method or the system determines not to include an instance or a net driven by the driver that drives multiple loads in the reduced physical design data, the method or the system anchors or fixes the driver rather than simply places the driver. In these embodiments, anchoring the driver ensures no degradation on the side path when various processes or modules optimize the interface path(s). In some embodiments where the method or the system determines to keep all the side instances in the reduced physical design data, no driver needs to be fixed in the design. In some embodiments where the method or the system determines not to keep at least one side instance in the reduced physical design data, the method or the system anchors the driving instance on the net and thus guarantees LEC cleanliness. In these embodiments, the method or the system anchors the driving instance to ensure that the netlist after the full-chip optimization is logically equivalent to the netlist prior to the full-chip optimization with reduced physical data.

In some embodiments where the block level timing is closed, the reduced netlist includes one or more side paths for one or more critical interface paths and thus prevents timing jump when optimizing or fixing the interface path(s). In some embodiments where block level timing is not closed, the method or the system fixes or anchors the interface logic after committing the one or more changes made during the full-chip optimization process. In these embodiments, the method or the system may continue block level optimization after committing the one or more changes made during the full-chip optimization process.

At 408, the method or the system may further comprise the method or the process for including one or more side instance(s) or one or more side path(s) in an incomplete or partial netlist in one or more embodiments. At 410, the method or the system may further comprise the method or the process for identifying or generating the reduced physical design data for the incomplete or partial netlist from one or more files that include the physical design data in some embodiments. For example, the method or the system may determine the physical design data that are sufficient for placement or routing or other physical design activities from one or more physical design files such as the LEF/DEF® or Milkyway® physical design database. In one or more embodiments, the reduced physical design data do not include at least one side instance and thus at least one side path, the system or the method therefore performs the process for performing full-chip optimization with an incomplete logic due to the exclusion of the at least one instance from the reduced physical design data in some embodiments. In addition or in the alternative, the method or the system comprises the process or module for performing the full-chip optimization with incomplete routing information or data due to the exclusion of the at least one side instance from the reduced physical design data in some embodiments.

At 412, the method or the system may further comprise the method or the process for performing full-chip extraction in some embodiments. In some embodiments, the method or the system performs in some embodiments where various processes and modules are applied to an ECO (engineering change order) process for an existing design, the method and the system comprise the process or module for performing incremental extraction by extracting only the necessary information or data from the electronic design rather than performing full-chip extraction on the entire electronic design. In some embodiments, the method or the system performs extraction to determine the parasitic effects such as various types of capacitances, resistances, and inductances. In some embodiments, the method or the system uses the parasitic information determined at 412 as well as the reduced physical design data in performing full-chip optimization. In various embodiments, various processes or modules apply to both a flat electronic design and a hierarchical electronic design with equal force.

In one or more embodiments, the reduced physical design data do not include at least one side instance and thus at least one side path, the system or the method therefore performs the process for performing full-chip optimization with an incomplete parasitics due to an incomplete netlist resulting from the exclusion of at least one side path from the reduced physical design data in some embodiments. In addition or in the alternative, the method or the system comprises the process or module for performing the full-chip optimization with incomplete routing information or data due to the exclusion of the at least one side instance or the at least one side path associated with the side instance from the reduced physical design data in some embodiments.

In some other embodiments, the method or the system may further comprises the process or module for identifying or determining a routing density map that includes the routing density data or information for the side instances or side paths that are included in the reduced physical design data as well as the side instances or side paths that are excluded in the reduced physical design data. In these embodiments, the method or the system may then use the needed routing information or data in the routing density map that represent the side instances or side paths that are excluded from the reduced physical design data to account for the parasitic effects of these excluded side instances or side paths.

Figure 5:
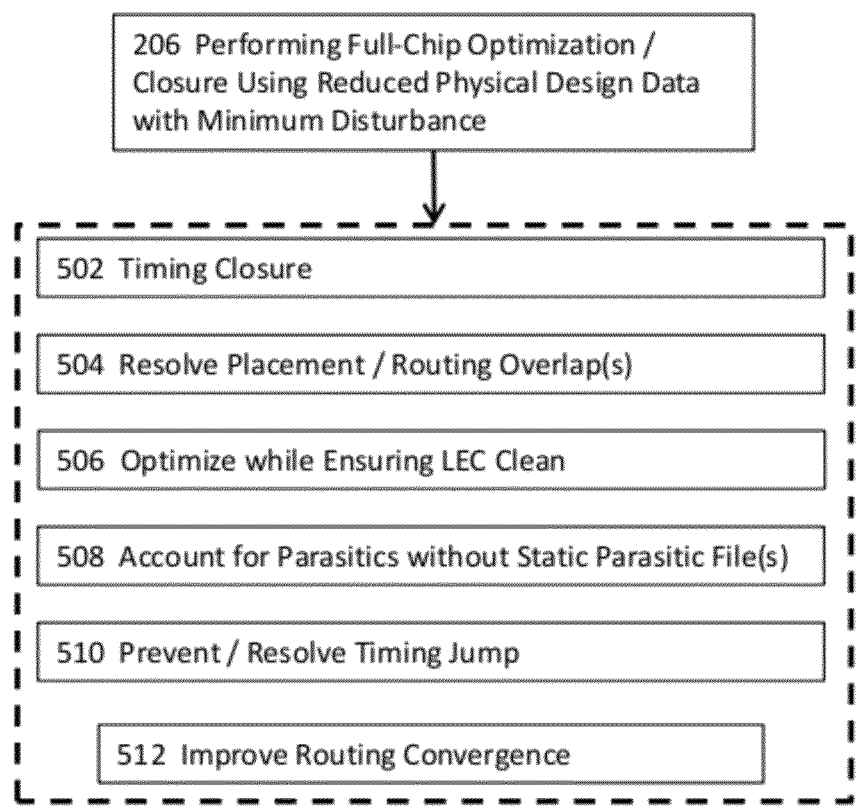
FIG. 5 illustrates more details for a part of the method or system for implementing full-chip optimization using reduced physical design data in some embodiments.

FIG. 5 illustrates more details for a part of the method or system for implementing full-chip optimization using reduced physical design data in some embodiments. More particularly, FIG. 5 illustrates more details about the process or module for performing full-chip optimization or closure using reduced physical design data in some embodiments. In some embodiments, the process or module for performing full-chip optimization or closure using reduced physical design data is performed with minimal disturbance to the existing logic. In some embodiments, the process or module for performing full-chip optimization or closure using reduced physical design data is performed by using the timing-aware logic synthesis process, a timing-aware placement process, a timing-aware clock tree synthesis process, and/or a timing-aware routing process to ensure proper timing closure at 502.

The method or the system may further comprise the process or module for resolving placement issues, such as fully or partly overlapping instances or overlapping or intersecting paths at 504 in some embodiments. More details about the process or module for resolving placement or routing issues will be provided in subsequent paragraphs with reference to one or more figures. In some embodiments, the method or the system may further comprise the process or module for optimizing or improving various aspects of the electronic design while ensuring LEC cleanliness at 506. In these embodiments, the method or the system performs various actions, which will be described in greater details below, to ensure that the post-optimization netlist is logically equivalent to the pre-optimization netlist.

The method or the system may further account for the parasitic effects of the included instances and paths in the reduced physical design data as well as the parasitic effects of the excluded instances and paths in the reduced physical design data at 508 in some embodiments. In addition or in the alternative, the method or the system may further comprise the process or module for preventing or resolving timing jump for one or more masked paths (e.g., a side path that is excluded from the reduced physical data) at 510 in some embodiments. In some of these embodiments where various processes or modules are applied in a pre-CTS design stage during which the clock has not been propagated, and an ideal clock is used, timing jump may arise due to the lack of accurate timing information or data. In some of these embodiments, the method or the system may comprise the process or module for improving or optimizing routing convergence at 512. More details about various processes or modules illustrated in FIG. 5 will be provided in subsequent paragraphs with reference to one or more figures.

Figure 6:
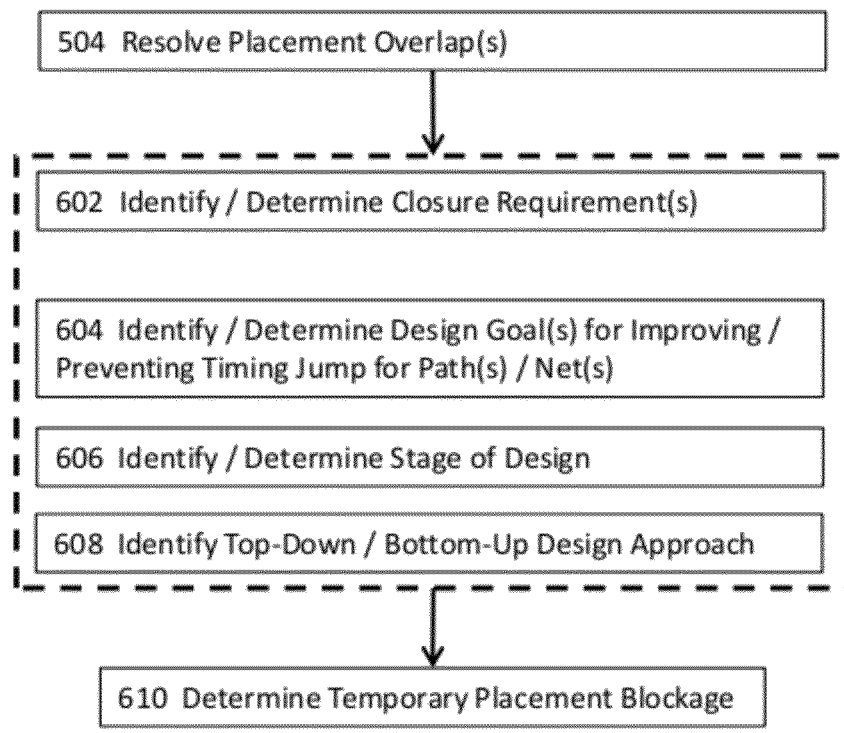
FIG. 6 illustrates more details for a part of the method or system for implementing full-chip optimization using reduced physical design data in some embodiments.

FIG. 6 illustrates more details for a part of the method or system for implementing full-chip optimization using reduced physical design data in some embodiments. More particularly, FIG. 6 illustrates more details about the process or module for resolving placement or routing issues in some embodiments. In some embodiments, the method or the system for resolving placement or routing issues may comprise the process or module for identifying or determining one or more closure requirements or constraints at 602. In some embodiments, the closure requirements or constraints comprise one or more timing closure requirements or constraints.

At 604, the method or the system may further comprise the process or module for identifying or determining one or more design goals or objectives for improving or preventing timing jump for one or more masked paths such as a side path that is excluded in the reduced physical design data used for the process or module for full-chip optimization. In some embodiments, the one or more goals or objectives comprise an intended objective to prevent timing jump for the one or more masked paths that are not included in the reduced physical design data used during the full-chip optimization. In some embodiments, the one or more goals or objectives comprise one or more timing requirements for the active area that is available for use in adjusting the placement of one or more shapes or routing of one or more interconnects. In some embodiments, the method or the system establishes a sliding scale between the timing requirement for the active area and the intended objective to prevent timing jump for one or more masked paths and automatically adjusts the sliding scale to optimize the electronic design.

At 606, the method or the system may further comprise the process or module for identifying or determining the stage that the current electronic design is at in some embodiments. For example, the method or the system may determine whether the electronic design is currently at a pre-route design stage where no global or detailed routing data or information is available in some embodiments. As another example, the method or the system may determine whether the electronic design is currently at a post-route design stage where both the global and the detailed routing data or information are available in some embodiments. The method or the system may then react to the determined stage accordingly. For example, in some embodiments where the electronic design is currently at a pre-route stage, the method or the system may determine that a trial route or virtual route may be required. As another example, in some embodiments where the method or the system determines that the electronic design is currently at a post-route stage, the method or the system may then perform, for example, extraction on the post-route physical design without performing the trial route or virtual route. At 608, the method or the system may comprise the process or module for identifying whether the electronic design is hierarchical, and whether a top-down approach or a bottom-up approach is used in constructing the electronic design in some embodiments.

At 610, the method or the system may then determine the temporary placement blockages that are to be inserted into the design to prevent certain unoccupied areas from being used for timing closure or other purposes in some embodiments. In these embodiments, the determination of the amount or the locations of the temporary placement blockages is made based at least in part upon the results of one or more of the processes of 602, 604, 606, and 608 as described in the preceding paragraphs. In some embodiments, the method or the system determines the amount of temporary placement blockages based at least in part upon a tradeoff between one or more timing closure requirements for the active area and the intended objective for preventing timing jump for one or more masked paths.

Figure 7:
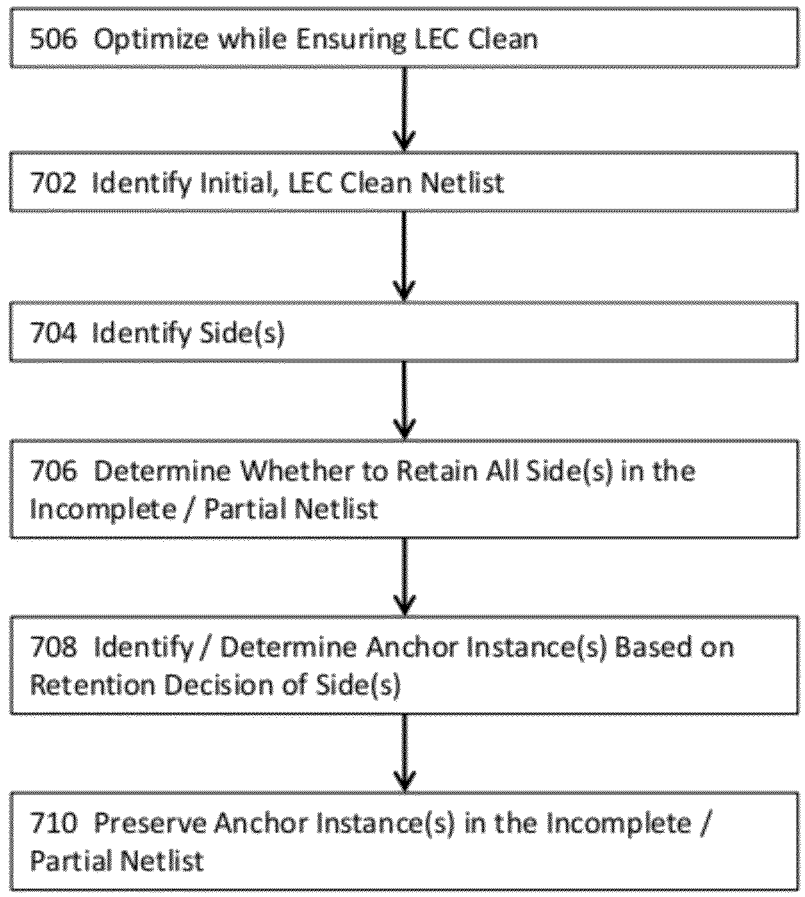
FIG. 7 illustrates more details for a part of the method or system for implementing full-chip optimization using reduced physical design data in some embodiments.

FIG. 7 illustrates more details for a part of the method or system for implementing full-chip optimization using reduced physical design data in some embodiments. More particularly, FIG. 7 illustrates a high level flow diagram for the process or module for performing full-chip optimization while ensuring the electronic design remains LEC clean in some embodiments. The process or module for performing full-chip optimization may comprise the process or module for identifying the initial netlist at 706 in some embodiments. In some embodiments, the initial netlist is also LEC clean. In these embodiments, the initial, LEC clean netlist together with various processes or modules that introduce no LEC issues ensure that the electronic design remains LEC clean throughout the full-chip optimization process and thus do not require separate logic equivalence check after the completion of the full-chip optimization although various processes or modules do not prevent a designer from performing a separate logic equivalence check as extra assurance.

The process or module 506 may further comprise the process or module for identifying or determining one or more side instances or one or more side paths for one or more blocks in the electronic design at 704 in one or more embodiments. The detailed process or module for identifying or determining these one or more side instances or one or more side paths has been described in great details in the preceding paragraphs with reference to one or more drawing figures and thus will not be repeated here. In one or more embodiments, the process or module 506 may further comprise the process or module for determining whether or not all these one or more side instances or one or more side paths are to be retained in the reduced physical design data at 706. The detailed process or module for determining whether or not all these one or more side instances or one or more side paths are to be retained in the reduced physical design data has also been described in great details in the preceding paragraphs with reference to one or more drawing figures and thus will not be repeated here.

The process or module 506 may further comprise the process or module 708 for identifying or determining one or more anchor instances that are to be anchored in the reduced physical design data based at least upon the result of determining whether or not all these one or more side instances or one or more side paths are to be retained in the reduced physical design data in one or more embodiments. In some embodiments where the method or the system determines to retain all the side instances and/or all the side paths, the method or the system may determine that no instances need to be anchored in the reduced physical design data. In some embodiments where the method or the system identifies and determines that at least one side instance is not retained in the reduced physical design data, the method or the system may then identify one or more anchor instances that are associated with the at least one side instance and determine that the anchor instance needs to be anchored in the reduced physical design data. The detailed process or module for identifying or determining one or more anchor instances has also been described in great details in the preceding paragraphs with reference to one or more drawing figures and thus will not be repeated here.

The process or module 506 may further optionally comprise the process or module 710 for preserving the one or more anchor instances in the incomplete or partial netlist in one or more embodiments. In some embodiments where the method or the system determines that no instances need to be anchored, the method or the system may skip the execution of the process or module 710.

Figure 8:
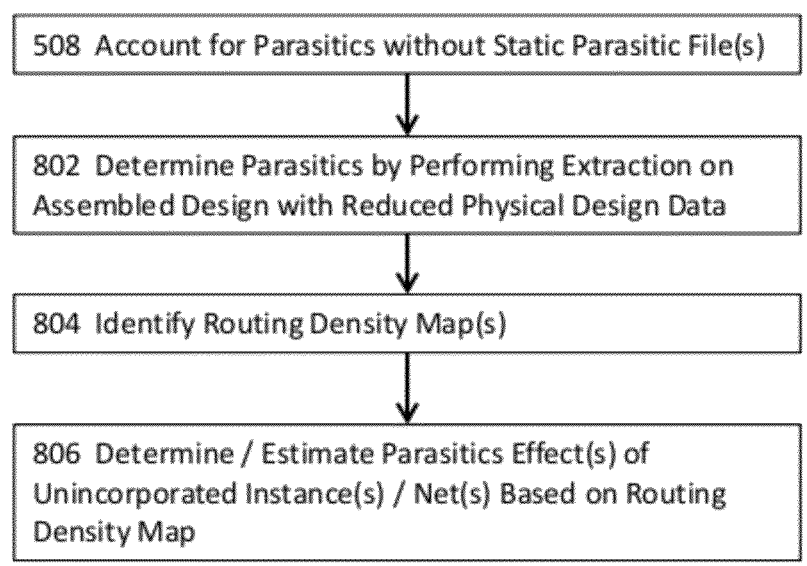
FIG. 8 illustrates more details for a part of the method or system for implementing full-chip optimization using reduced physical design data in some embodiments.

FIG. 8 illustrates more details for a part of the method or system for implementing full-chip optimization using reduced physical design data in some embodiments. More particularly, FIG. 8 illustrates a top level flow diagram for the process or module for accounting for parasitics (508) in some embodiments. In some of these embodiments, the method or the system as described herein account for the parasitics or parasitic effects of various instances and interconnects without using or referring to a static parasitic file or database entries that contain static parasitic information or data from extraction and thus cannot be modified unless the requisite extraction is performed again.

A typical example of such static parasitic files comprises a SPEF (Standard Parasitic Exchange Format) file or database entries that represent parasitic data such as resistance, capacitance, and inductance in an electronic circuit in ASCII (American Standard Code for Information Interchange) format and are commonly used in timing or delay calculation or signal integrity analyses. Another example of the static parasitic files or database entries comprise a DSPF (Detailed Standard Parasitic Format) or RSPF (Reduced Standard Parasitic Format) file or database entries that contain parasitic data and are commonly used during, for example, place and route of ASIC (Application-Specific Integrated Circuit), SoC (System-on-Chip), and ASSP (Application-Specific Standard Part) designs and timing or signal integrity analyses. One common way of storing the parasitic information or data is to gather the parasitic data or information from extraction and then store the extracted parasitic data or information in a database (e.g., a timing database, a physical design database, or a parasitic data database) in a format such as the SPEF, DSPF, or RSPF format.

In some embodiments, the process or module for accounting for parasitics (508) comprises the process or module (802) for determining parasitic information or data by performing extraction on the assembled electronic design with reduced physical design data. In some embodiments, the electronic design with reduced physical design data comprise the physical data of the instances and/or interconnect paths that are included in the reduced physical design data. The identification and generation of the reduced physical design data have been described in great details in some of the preceding paragraphs with reference to various drawing figures and thus will not be repeated here.

It shall be noted that the reduced physical design data may comprise different information or data based on which stage the electronic design is currently at. For example, in some embodiments where the electronic design is currently at the post-placement, pre-CTS stage, the reduced physical design data upon which the parasitics are based may comprise the placement information or data (e.g., information or data from pre-placement optimization, information or data from post-placement, pre-CTS optimization, information or data from post-placement, post CTS optimization, etc.) and the information or data from trial route or virtual route. In some embodiments where the electronic design is currently at the post-CTS, pre-routing stage, the reduced physical design data upon which the parasitics are based may comprise the placement information or data (e.g., information or data from pre-placement optimization, information or data from post-placement, pre-CTS optimization, information or data from post-placement, post CTS optimization, etc.) and the information or data from trial route or virtual route.

In some embodiments where the electronic design is currently at the post-CTS, post-routing stage, the reduced physical design data upon which the parasitics are based may comprise the placement information or data (e.g., information or data from pre-placement optimization, information or data from post-placement, post-CTS, pre-SI (signal integrity) optimization, information or data from post-placement, post CTS optimization, etc.) and the information or data from global and/or detailed routing without the coupling effects. In some embodiments where the electronic design is currently at the post-routing, post-SI stage, the reduced physical design data upon which the parasitics are based may comprise the placement information or data (e.g., information or data from pre-placement optimization, information or data from post-placement, pre-CTS optimization, information or data from post-placement, post CTS optimization, etc.) and the information or data from global and/or detailed routing with the coupling effects.

In some embodiments, the process or module for accounting for parasitics (508) comprises the process or module (804) for identifying one or more routing density maps. In some embodiments, the one or more routing density maps may be used to account for the parasitic effects of instances, paths, or nets that are not incorporated in the reduced physical design data. In these embodiments, the process or module for accounting for parasitics (508) comprises the process or module (806) for determining or estimating the parasitic effects of the instances, paths, or nets, which are not incorporated or included in the reduced physical design data, based at least in part upon the one or more routing density maps.

Figure 9:
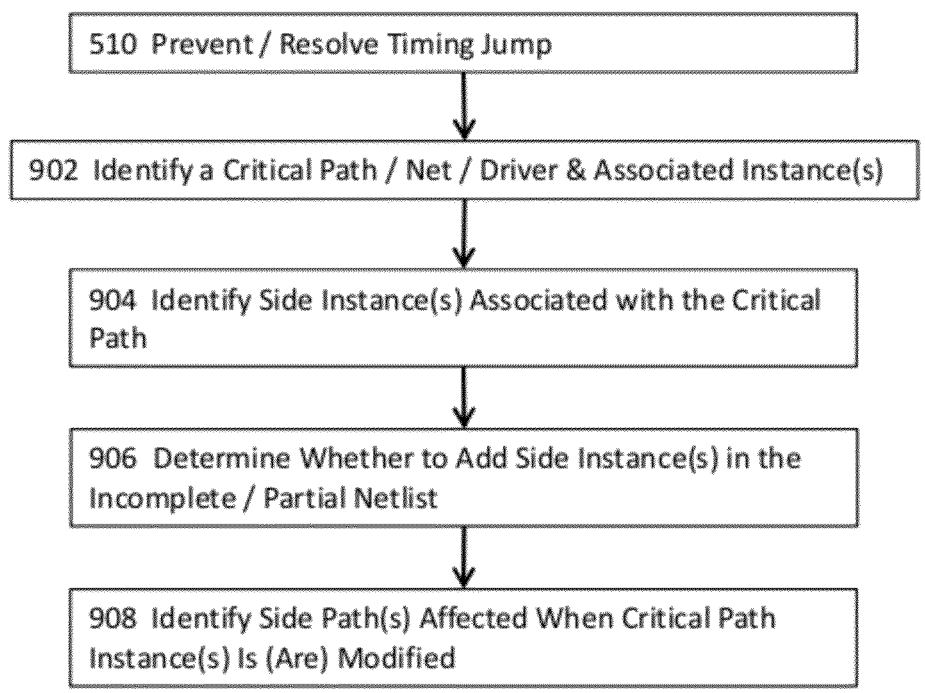
FIG. 9 illustrates more details for a part of the method or system for implementing full-chip optimization using reduced physical design data in some embodiments.

FIG. 9 illustrates more details for a part of the method or system for implementing full-chip optimization using reduced physical design data in some embodiments. More particularly, FIG. 9 illustrates a top level flow diagram for the process or module (510) for preventing, resolving, or improving the timing jump on one or more paths or that are not included in the reduced physical design data in some embodiments. In these embodiments where the method or the system determines that one or more side instances and/or their corresponding side paths are not included in the reduced physical design data, the process or module (508) may comprise the process or module (902) for identifying a critical driver, path, or net with respect to the interface of a specific block in some embodiments.

For example, the method or the system may identify a driver, path, or net that may impact the timing of the interface of a block as the critical path or net. Another example of a critical driver, path, or net is a path or net connected to the critical driver that drives multiple loads such as a plurality of fan-outs. In this example, while only some but not all of the loads are associated with the block of interest, the other loads or fan-outs may also impact the timing or logic on the interface or on the block itself. In some of these embodiments, the method or the system may also identify the instance(s) associated with or on the identified critical path. For example, the method or the system may use the connectivity information in the netlist to identify all the instances on a critical path up to a register on the path. In some embodiments, the process or module (508) may comprise the process or module (904) for identifying one or more side instances and/or one or more side paths associated with the critical path or net. The process or module for identifying side instances and side paths has been described in great details in the preceding paragraphs and thus will not be repeated here.

In some embodiments, the process or module (508) may comprise the process or module (906) for determining whether or not to add some of these one or more side instances or one or more side paths into the reduced physical design data. If the method or the system determines that at least one of these one or more side instances or one or more side paths is to be added to the reduced physical design data, the method or the system then adds the at least one of the side instances or side paths to the partial, incomplete netlist in some embodiments. In some embodiments, the process or module (508) may comprise the process or module (908) for identifying one or more side paths that may be affected when the critical path, driver, or net or one or more instances therein are modified during the full-chip optimization.

For example, the method or the system may identify a path whose delay changes due to the change(s) on the critical path, net, or driver as a side path in some embodiments. In these embodiments, the change in delay of the side path may be termed the first order timing effect. As another example, the method or the system may identify a path whose slew changes due to the change(s) on the critical path, net, or driver in some embodiments. For example, considering a side path that includes an AND gate with inputs A and B, where A is part of a critical path, and B is part of a non-critical path. Timing analysis may select the maximum of the delay from both A and B and also the maximum slew from both A and B. There may be times where A has the maximum slew while B has the maximum delay or vice versa. In these embodiments as illustrated by this example, the change in slew in a side path due to change(s) to the critical path may be termed the second order timing effect. By performing at least some of the processes as described for 902-908 of FIG. 9 and/or some of the processes as described for FIG. 6, the method or the system may then prevent or improve timing jump for one or more paths that are masked or excluded in the reduced physical design data in some embodiments.

Figure 10:
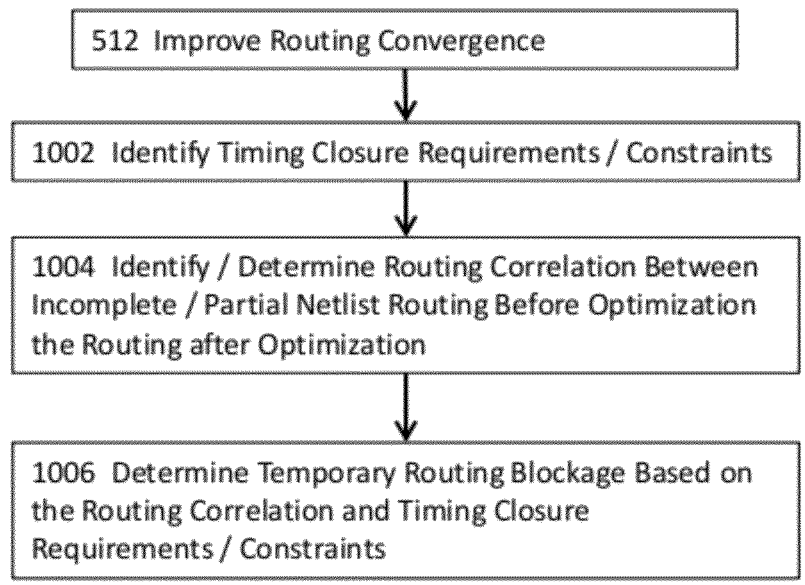
FIG. 10 illustrates more details for a part of the method or system for implementing full-chip optimization using reduced physical design data in some embodiments.

FIG. 10 illustrates more details for a part of the method or system for implementing full-chip optimization using reduced physical design data in some embodiments. More particularly, FIG. 10 illustrates a top level diagram for the process or module for improving routing convergence (512) in some embodiments. The process or module for improving routing convergence may comprise the process or module (1002) for identifying one or more closure requirements (such as some timing closure requirements, etc.) or one or more timing constraints in some embodiments. The process or module for improving routing convergence may comprise the process or module (1004) for identifying or determining a routing correlation between the incomplete or partial netlist routing before the full-chip optimization and the routing after the performance of the full-chip optimization in some embodiments. For example, in some embodiments where the electronic design is at a post-placement, pre-CTS stage, the method or the system may first identify the trial route or the virtual route based on the partial, incomplete netlist and then identify the routing information based on the trial route or virtual route after the completion of the full-chip optimization. The method or the system may then determine a correlation between the pre-optimization routing and the post-optimization in these embodiments.

The process or module for improving routing convergence may further optionally comprise the process or module for preserving the routing correlation in some embodiments. The process or module for improving routing convergence may comprise the process or module (1006) for identifying or determining temporary routing blockage(s) based at least in part upon the routing correlation, the closure requirements, or the timing constraints in some embodiments. In some embodiments, a temporary routing blockage may be used to block off the locations, lines, or areas that are occupied by the unincorporated nets or interconnects to improve routing overlaps. In addition or in the alternative, the process or module (512) may further comprise the process or module for adjusting one or more routing resources to improve routing convergence in some embodiments. In some embodiments, the process or the module (512) for improving routing convergence may also comprise relaxing one or more closure requirements or one or more constraints to improve routing convergence. For example, the process or the module (512) may relax a routing constraint to allocate two tracks per interconnect rather than four tracks per interconnect based on the criticality or performance requirements of a portion of the electronic design to which the interconnect belongs in some embodiments.

Figure 11:
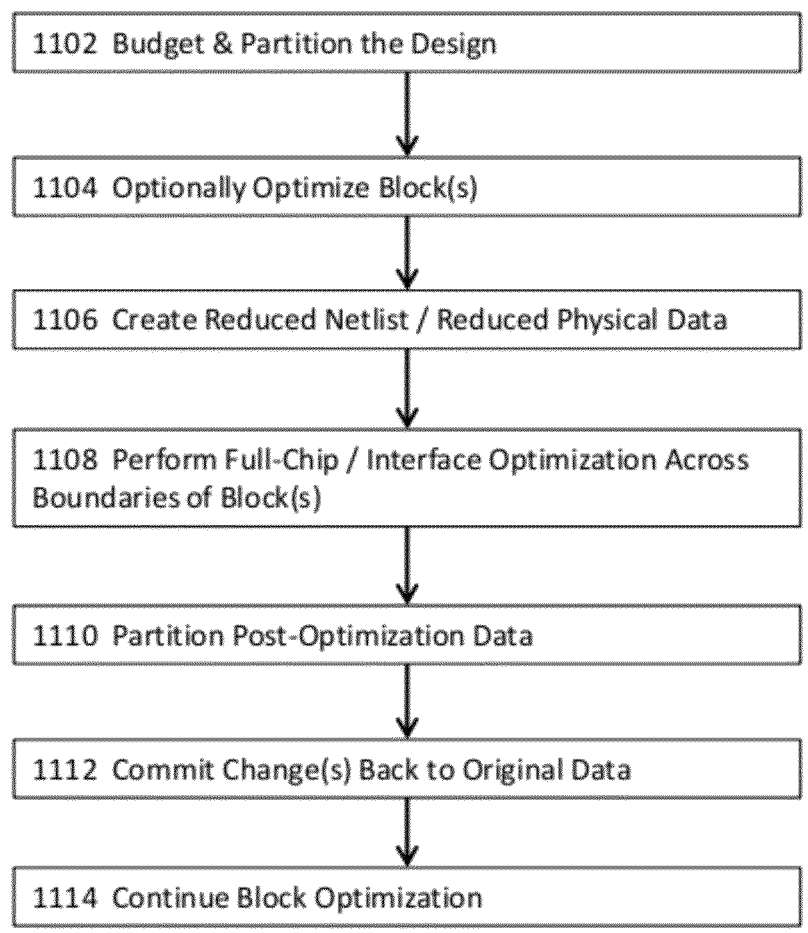
FIG. 11 illustrates a top level block diagram for implementing various embodiments of the methods or systems for implementing full-chip optimization using reduced physical design data in some embodiments.

FIG. 11 illustrates a top level block diagram for implementing various embodiments of the methods or systems for implementing full-chip optimization using reduced physical design data in some embodiments. The method or the system for implementing full-chip optimization with reduced physical design data may comprise the process or module (1102) of performing design partitioning and/or design budgeting for the electronic design in some embodiments. For example, the method or the system may partition the electronic design into a plurality of blocks and then performs IO (Input Output) budgeting or design budgeting for the partitioned electronic design in some embodiments. In some embodiments, the method and the system require no re-budgeting iterations that are required in conventional approaches adopting the interface logic models (ILMs). In these embodiments, the partitioned blocks are assembled into the top level of the electronic design, and thus the method or the system for implementing full-chip optimization need not look at the budgets at all because all cross partition optimization and routing are performed with flat data.

The method or the system may further optionally comprise the process or module (1104) for optimizing the individual block(s) in some embodiments. In these embodiments, the method or the system may optimize or even further close on some of the individual blocks prior to the performance the full-chip optimization. Nonetheless, the method or the system does not require that individual blocks be optimized or closed at this point in some embodiments. In some embodiments where some individual blocks are not optimized or closed or timing is not closed for the assembled electronic design, the method or the system performs the full-chip optimization across individual block boundaries and then iteratively loops back to determine whether timing is closed for the assembled electronic design.

The method or the system may further comprise the process or module (1106) for generating an incomplete, partial netlist or reduced physical design data in some embodiments and the process or module (1108) for performing full-chip or interface optimization across boundaries of individual blocks in some embodiments. The processes or modules of generating the partial, incomplete netlist or reduced physical design data and for performing full-chip or interface optimization have been described in great details in preceding paragraphs with reference to multiple drawing figures and thus will not be repeated here.

The method or the system may further comprise the process or module (1110) for partitioning the post-optimization design data in some embodiments. In these embodiments, the method or the system may ensure that each data entry resulting from the full-chip optimization is attributed to the correct portion of the electronic design. For example, in some embodiments where a buffer or inverter pair is added logically to a block, the method or the system to ensure that the added buffer or inverter pair is physically placed within the block boundary. In some embodiments where the buffer or inverter pair is not placed within the block boundary initially, the method or the system may subsequently push it within the correct boundary of a block. In some embodiments where a buffer or inverter pair is added logically to the top level of the electronic design, the method or the system ensures that the buffer or inverter pair is placed at the top level outside the boundaries of individual blocks. If the method or the system determines that the added buffer or inverter pair is not placed at the top level outside the boundaries of individual blocks, the method or the system may then push the added buffer or inverter pair to the top level outside the boundaries of individual blocks in some embodiments.

The method or the system may comprise the process or module (1112) for committing the changes made during the full-chip optimization back to the original set of data and then proceeds to continue individual block optimization or closure if some individual blocks have not been optimized or closed in some embodiments.

Figure 12:
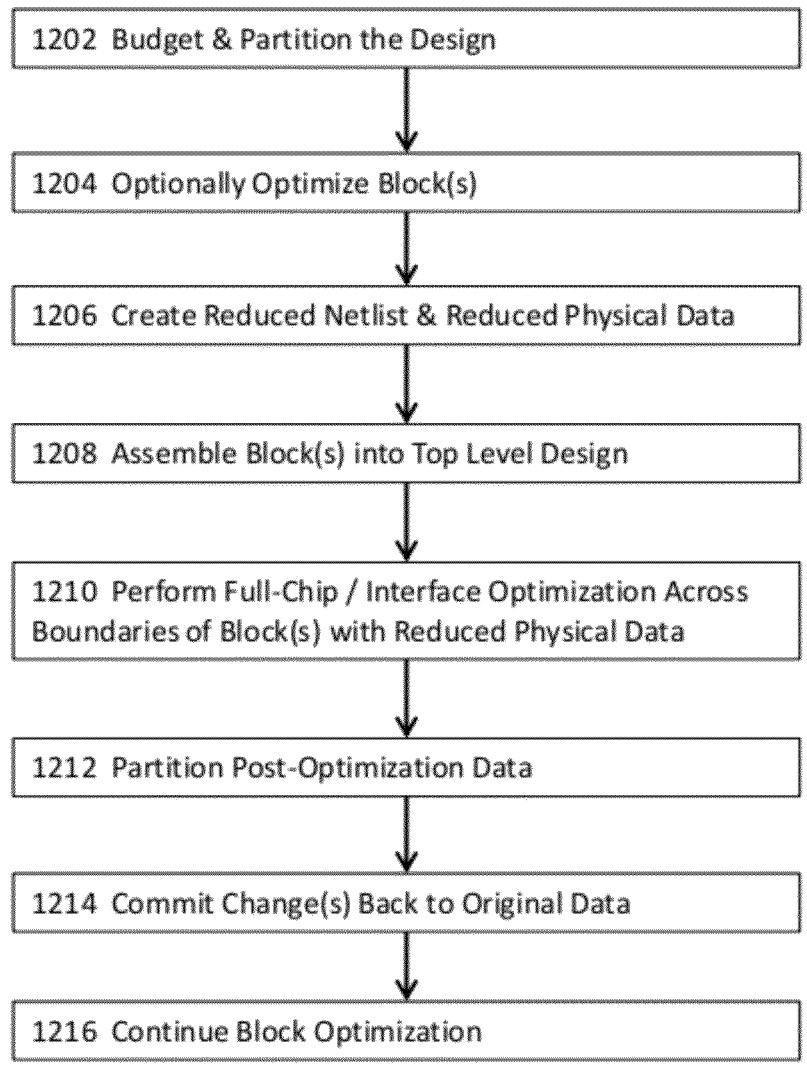
FIG. 12 illustrates a top level block diagram for implementing various embodiments of the methods or systems for implementing full-chip optimization using reduced physical design data in some embodiments.

FIG. 12 illustrates a top level block diagram for implementing various embodiments of the methods or systems for implementing full-chip optimization using reduced physical design data in some embodiments. The method or system for implementing full-chip optimization using reduced physical design data illustrated in FIG. 12 may optionally comprise the process or module (1202) for performing design partitioning and/or design budgeting for the electronic design in some embodiments. The method or the system may further optionally comprise the process or module (1204) for performing optimization or closure for some or all individual blocks in some embodiments. Nonetheless, the method and the system do not require that individual blocks be optimized or closed at this point in some embodiments.

The method or the system may further optionally comprise the process or module (1206) for generating a partial, incomplete netlist or a reduced set of physical design data based on the partial, incomplete netlist in some embodiments. The method or the system may further optionally comprise the process or module (1208) for assembling the individual blocks into a top level design in some embodiments. It shall be noted that various embodiments disclosed herein apply to both a flat electronic design and a hierarchical electronic design. The mention of "top level" throughout the entire disclosure does not explicitly or implicitly imply that the electronic design is a hierarchical design. Rather, the top level refers to the portion of the electronic design that is outside the individual blocks which are products of a design partitioning process.

The method or the system may further optionally comprise the process or module (1210) for performing full-chip or interface optimization across the boundaries of one or more individual blocks using the reduced physical design data instead of the full netlist or the full set of physical design data in some embodiments. The method or the system may further optionally comprise the process or module (1212) for partitioning the post-optimization data in some embodiments. The method or the system may further optionally comprise the process or module (1214) for committing changes made during the full-chip optimization back to the original set of design data in some embodiments. In some embodiments where some individual blocks have not been optimized or closed, the method or the system may further comprise the process or module (1216) for continuing to perform optimization or closure for these individual blocks.

Figure 13:
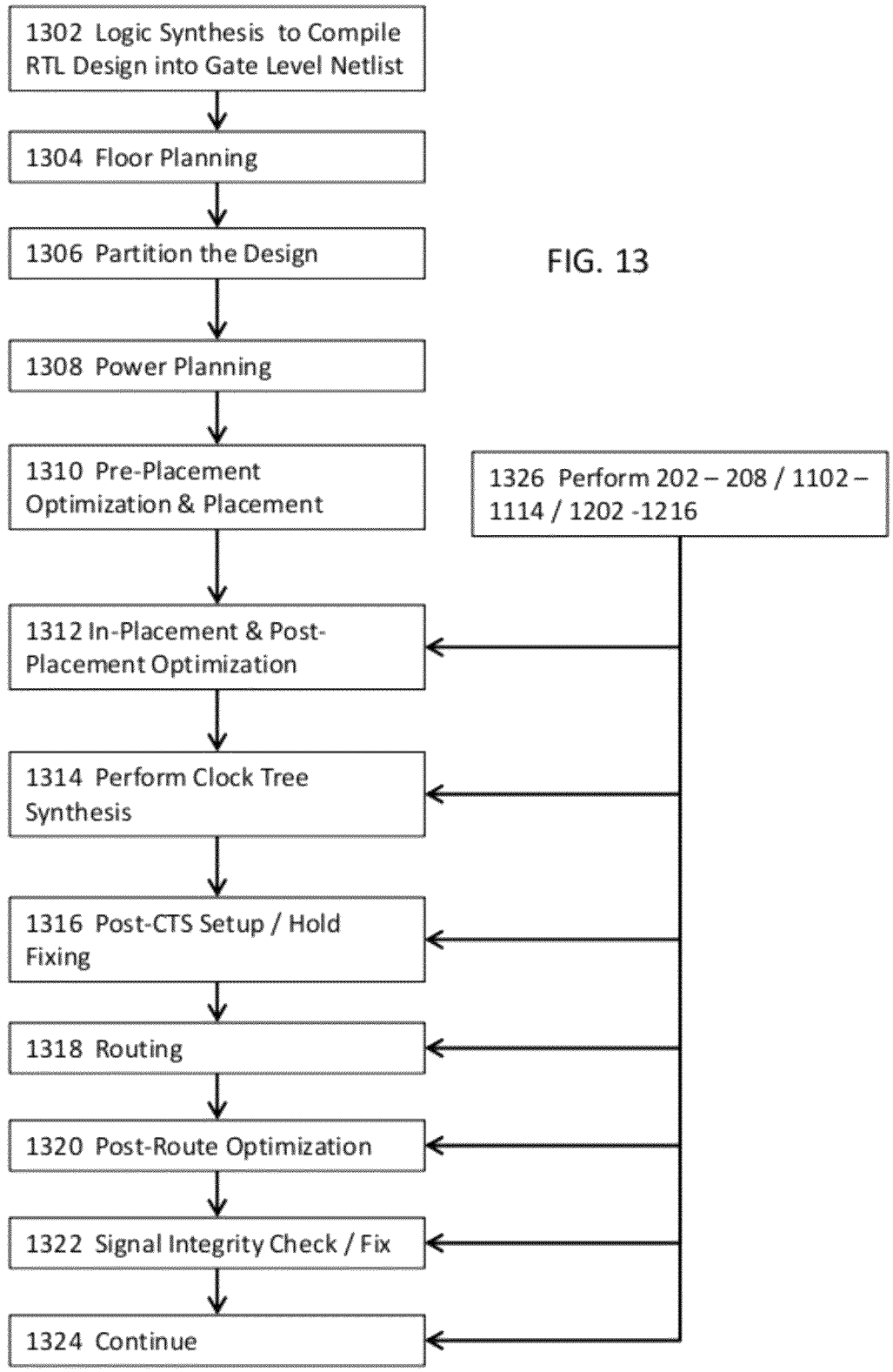
FIG. 13 illustrates a top level block diagram for implementing various embodiments of the methods or systems for implementing full-chip optimization using reduced physical design data in some embodiments.

FIG. 13 illustrates a top level block diagram for implementing various embodiments of the methods or systems for implementing full-chip optimization using reduced physical design data in some embodiments. In one or more embodiments, the method or the system for implementing full-chip optimization using reduced physical design data illustrated in FIG. 13 may comprise the process or module (1302) for performing logic synthesis to compile an RTL (register Transfer Level) design into a gate level netlist. The method or the system may further comprise the process or module (1304) for performing floor planning in some embodiments. The method or the system may further comprise the process or module (1306) for partitioning the electronic design of interest into a plurality of blocks in some embodiments.

For example, the method or the system may partition an electronic design into the clock and logic groups in some embodiments. The method or the system may further comprise the process or module (1308) for performing power planning based at least in part upon the partitioning and the floorplanning of the electronic design in some embodiments. The method or the system may further comprise the process or module (1310) for performing one or more of pre-placement optimization or placement in some embodiments. The method or the system may further comprise the process or module (1312) for performing in-placement optimization or post-placement optimization in some embodiments. For example, the method or the system may perform pre-CTS setup time fixing at 1312 in some embodiments. The method or the system may further comprise the process or module (1314) for performing clock tree synthesis to propagate the clock in some embodiments. The method or the system may further comprise the process or module (1316) for performing post-CTS setup time and hold time fixing in some embodiments. The method or the system may further comprise the process or module (1318) for performing global and detailed routing for the electronic design in some embodiments. The method or the system may further comprise the process or module (1320) for performing post-route optimization in some embodiments. The method or the system may further comprise the process or module (1322) for performing signal integrity check and fixing in some embodiments. The method or the system may further continue to perform the remaining processes to bring the electronic design to tapeout-ready at 1324 in some embodiments.

Moreover, FIG. 13 illustrates the various stages at which various embodiments disclosed in the preceding paragraphs with reference to FIGS. 1-12 may be applied. In one or more embodiments, the method or the system may comprise the process or module (1326) for performing some or all of the processes or modules of 202-208, 1102-1114, or 1202-1206 as soon as some physical information or data become available. Therefore, FIG. 13 provides some illustrative examples to show some exemplary stages of the design where some or all of the processes or modules of 202-208, 1102-1114, or 1202-1206 may be applied. For example, the method or the system may comprise the process or module (1326) for performing some or all of the processes or modules of 202-208, 1102-1114, or 1202-1206 after the performance of the pre-placement optimization or the placement but before the performance of in-placement optimization or post-placement optimization (1312) in some embodiments.

The method or the system may comprise the process or module (1326) for performing some or all of the processes or modules of 202-208, 1102-1114, or 1202-1206 after the in-placement or post-placement optimization at 1312 but before the performance of clock tree synthesis at 1314 in some embodiments. The method or the system may comprise the process or module (1326) for performing some or all of the processes or modules of 202-208, 1102-1114, or 1202-1206 after the performance of clock tree synthesis at 1314 but before the post-CTS setup and hold time fixing at 1316 in some embodiments. The method or the system may comprise the process or module (1326) for performing some or all of the processes or modules of 202-208, 1102-1114, or 1202-1206 after the post-CTS setup/hold fixing at 1316 but before the performance of routing, such as global routing and/or detailed routing, at 1318 in some embodiments. The method or the system may comprise the process or module (1326) for performing some or all of the processes or modules of 202-208, 1102-1114, or 1202-1206 after the global and detailed routing at 1318 but before the post-route optimization at 1320 in some embodiments.

The method or the system may comprise the process or module (1326) for performing some or all of the processes or modules of 202-208, 1102-1114, or 1202-1206 after the post-route optimization at 1320 but before the signal integrity check at 1322 in some embodiments. The method or the system may comprise the process or module (1326) for performing some or all of the processes or modules of 202-208, 1102-1114, or 1202-1206 after the signal integrity check at 1322 in some embodiments. As described in some of the preceding paragraphs, different stages of the electronic design provide different types or levels of information and data. For example, at a pre-routing stage, global routing and detailed routing data are not available, and the method or the system may have to rely on the data or information from trial route or virtual route. Signal integrity check considers coupling effects, and the electronic design at a post-route but pre-SI stage includes global and detailed routing information and data without taking into account the coupling effects, while an electronic design at the post-SI stage provides global and detailed routing information or data with the coupling effects.

Figure 14A:
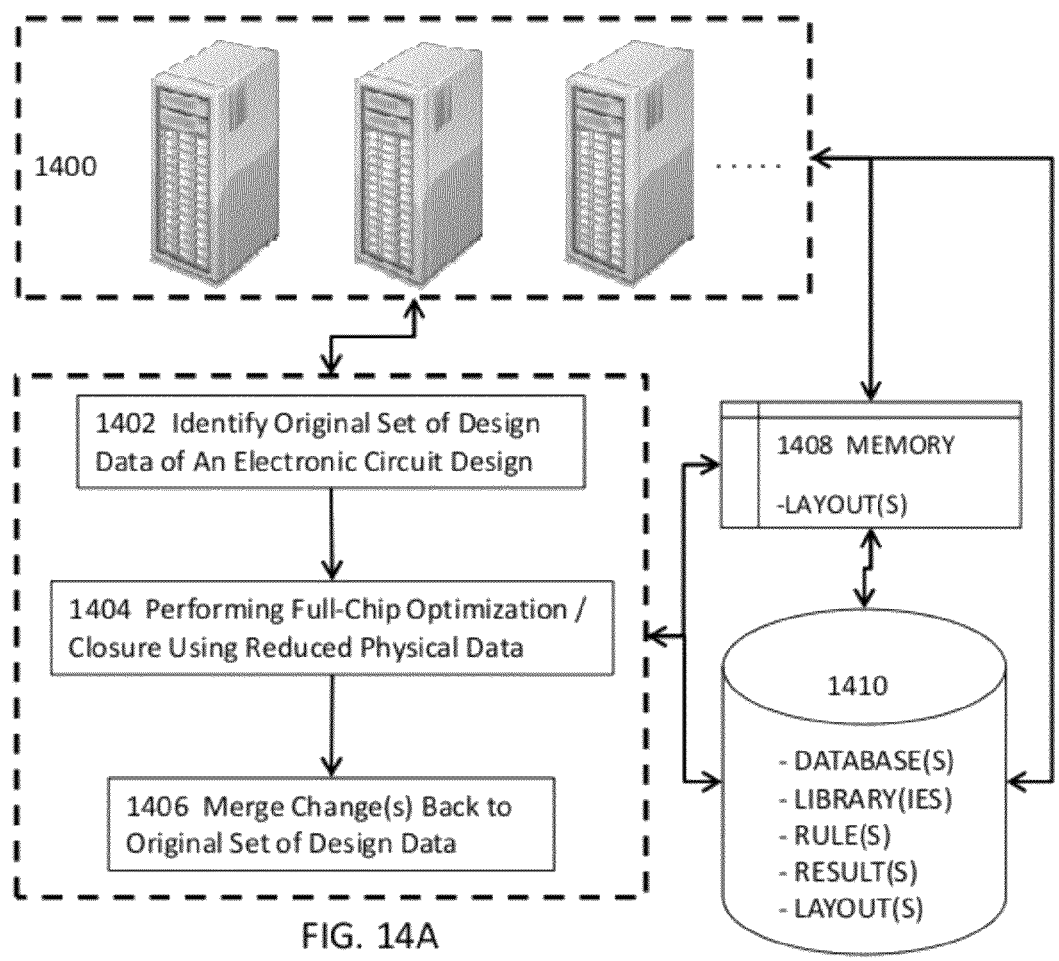
FIGS. 14A-B illustrate top level system block diagrams for implementing various embodiments of the methods or systems for implementing full-chip optimization using reduced physical design data in some embodiments.
Figure 14B:
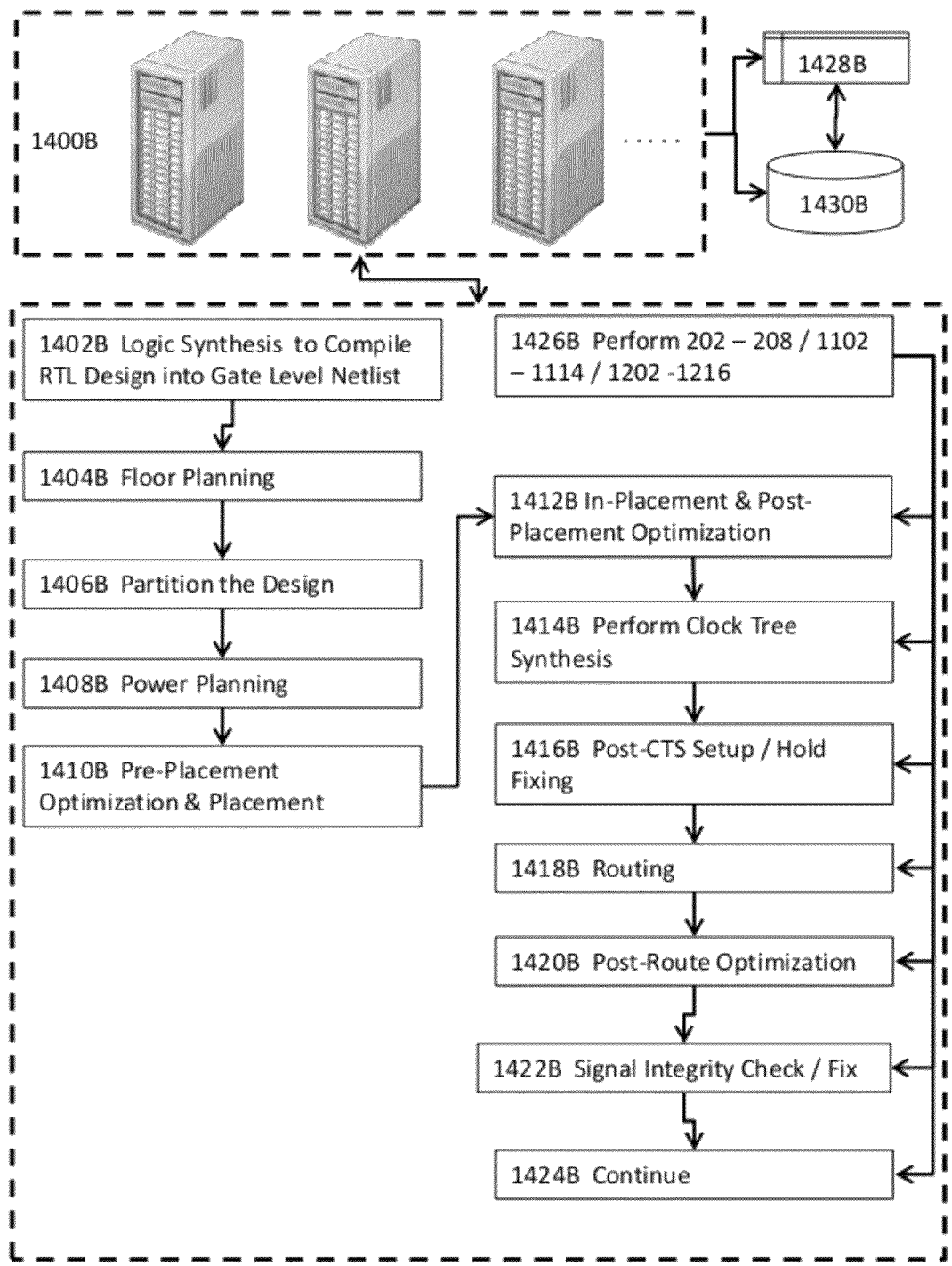

FIGS. 14A-B illustrate top level system block diagrams for implementing various embodiments of the methods or systems for implementing full-chip optimization using reduced physical design data in some embodiments. FIG. 14A illustrates a top level system block diagram for implementing various embodiments of the methods or systems for implementing full-chip optimization using reduced physical design data in some embodiments and comprises one or more computing nodes 1400 having one or more processor cores, each of which executes one or more threads for performing a process. The one or more computing nodes 1400 interact or are operatively coupled with volatile computer readable storage memory 1408 into which the electronic design may be loaded. The one or more computing nodes 1400 interact or are operatively coupled with a non-volatile computer readable storage memory 1410 that may include various databases, libraries, rules, results, or various forms of the electronic design such as schematics, layouts, etc.

The one or more computing nodes 1400 are configured or programmed to perform a process that includes identifying an original set of design data of an electronic design at 1402 in some embodiments. The one or more computing nodes 1400 are configured or programmed to perform a process that includes performing full-chip optimization or closure across boundaries of individual block(s) for the electronic design by using reduced physical design data at 1404 in some embodiments. The one or more computing nodes 1400 are configured or programmed to perform a process that includes identifying an original set of design data of an electronic design at 1406 in some embodiments.

FIG. 14B illustrates another top level system block diagram for implementing various embodiments of the methods or systems for implementing full-chip optimization using reduced physical design data in some embodiments and comprises one or more computing nodes 1400B having one or more processor cores, each of which executes one or more threads for performing a process. The one or more computing nodes 1400B interact or are operatively coupled with volatile computer readable storage memory 1428B into which the electronic design may be loaded. The one or more computing nodes 1400B interact or are operatively coupled with a non-volatile computer readable storage memory 1430B that may include various databases, libraries, rules, results, or various forms of the electronic design such as schematics, layouts, etc.

The one or more computing nodes 1400B are configured or programmed to perform a process that includes performing logic synthesis to compile an RTL design into a gate level netlist at 1402B in some embodiments. The one or more computing nodes 1400B are configured or programmed to perform a process that includes performing floor planning at 1404B in some embodiments. The one or more computing nodes 1400B are configured or programmed to perform a process that includes partitioning the electronic design into a plurality of blocks at 1406B in some embodiments. The one or more computing nodes 1400B are configured or programmed to perform a process that includes performing power planning at 1408B in some embodiments.

The one or more computing nodes 1400B are configured or programmed to perform a process that includes performing one or more of pre-placement optimization or placement at 1410B in some embodiments. The one or more computing nodes 1400B are configured or programmed to perform a process that includes performing in-placement optimization or post-placement optimization at 1412B in some embodiments. The one or more computing nodes 1400B are configured or programmed to perform a process that includes performing clock tree synthesis to propagate the clock at 1414B in some embodiments. The one or more computing nodes 1400B are configured or programmed to perform a process that includes performing post-CTS setup and hold time fixing at 1416B in some embodiments.

The one or more computing nodes 1400B are configured or programmed to perform a process that includes performing global and detailed routing for the electronic design at 1420B in some embodiments. The one or more computing nodes 1400B are configured or programmed to perform a process that includes performing post-route optimization at 1420B in some embodiments. The one or more computing nodes 1400B are configured or programmed to perform a process that includes performing signal integrity check and fixing at 1422B in some embodiments before the process proceeds to continue the remaining design processes for the electronic design to bring the electronic design to tapeout-ready in some embodiments.

Moreover, FIG. 14B illustrates the various stages at which various embodiments disclosed in the preceding paragraphs with reference to FIGS. 1-12 may be applied. As previously described, the method or the system may comprise the process or module (1326) for performing some or all of the processes or modules of 202-208, 1102-1114, or 1202-1206 as soon as some physical information or data become available in one or more embodiments. Therefore, FIG. 14B provides some illustrative examples to show some exemplary stages of the design where some or all of the processes or modules of 202-208, 1102-1114, or 1202-1206 may be applied. For example, one or more computing nodes 1400B are configured or programmed to perform a process that includes the process or module (1426B) for performing some or all of the processes or modules of 202-208, 1102-1114, or 1202-1206 after the performance of the pre-placement optimization or the placement but before the performance of the in-placement or the post-placement optimization (1312) in some embodiments. The method or the system may comprise the process or module (1426B) for performing some or all of the processes or modules of 202-208, 1102-1114, or 1202-1206 after the pre-placement or the post-placement optimization at 1412B but before the performance of clock tree synthesis at 1414B in some embodiments. The method or the system may comprise the process or module (1426B) for performing some or all of the processes or modules of 202-208, 1102-1114, or 1202-1206 after the performance of clock tree synthesis at 1414B but before the post-CTS setup and hold time fixing at 1416B in some embodiments.

The method or the system may comprise the process or module (1426B) for performing some or all of the processes or modules of 202-208, 1102-1114, or 1202-1206 after the post-CTS setup/hold fixing at 1416B but before the performance of routing, such as global routing and/or detailed routing, at 1418B in some embodiments. The method or the system may comprise the process or module (1426B) for performing some or all of the processes or modules of 202-208, 1102-1114, or 1202-1206 after the routing process or module at 1418B but before the post-route optimization at 1420B in some embodiments. The method or the system may comprise the process or module (1426B) for performing some or all of the processes or modules of 202-208, 1102-1114, or 1202-1206 after the post-route optimization at 1420B but before the signal integrity check at 1422B in some embodiments. The method or the system may comprise the process or module (1426B) for performing some or all of the processes or modules of 202-208, 1102-1114, or 1202-1206 after the signal integrity check at 1422B in some embodiments.

As described in some of the preceding paragraphs, different stages of the electronic design provide different types or levels of information and data. For example, at a pre-routing stage, global routing and detailed routing data are not available, and the method or the system may have to rely on the data or information from trial route or virtual route. Signal integrity check considers coupling effects, and the electronic design at a post-route but pre-SI stage includes global and detailed routing information and data without taking into account the coupling effects, while an electronic design at the post-SI stage provides global and detailed routing information or data with the coupling effects.

System Architecture Overview

Figure 15:
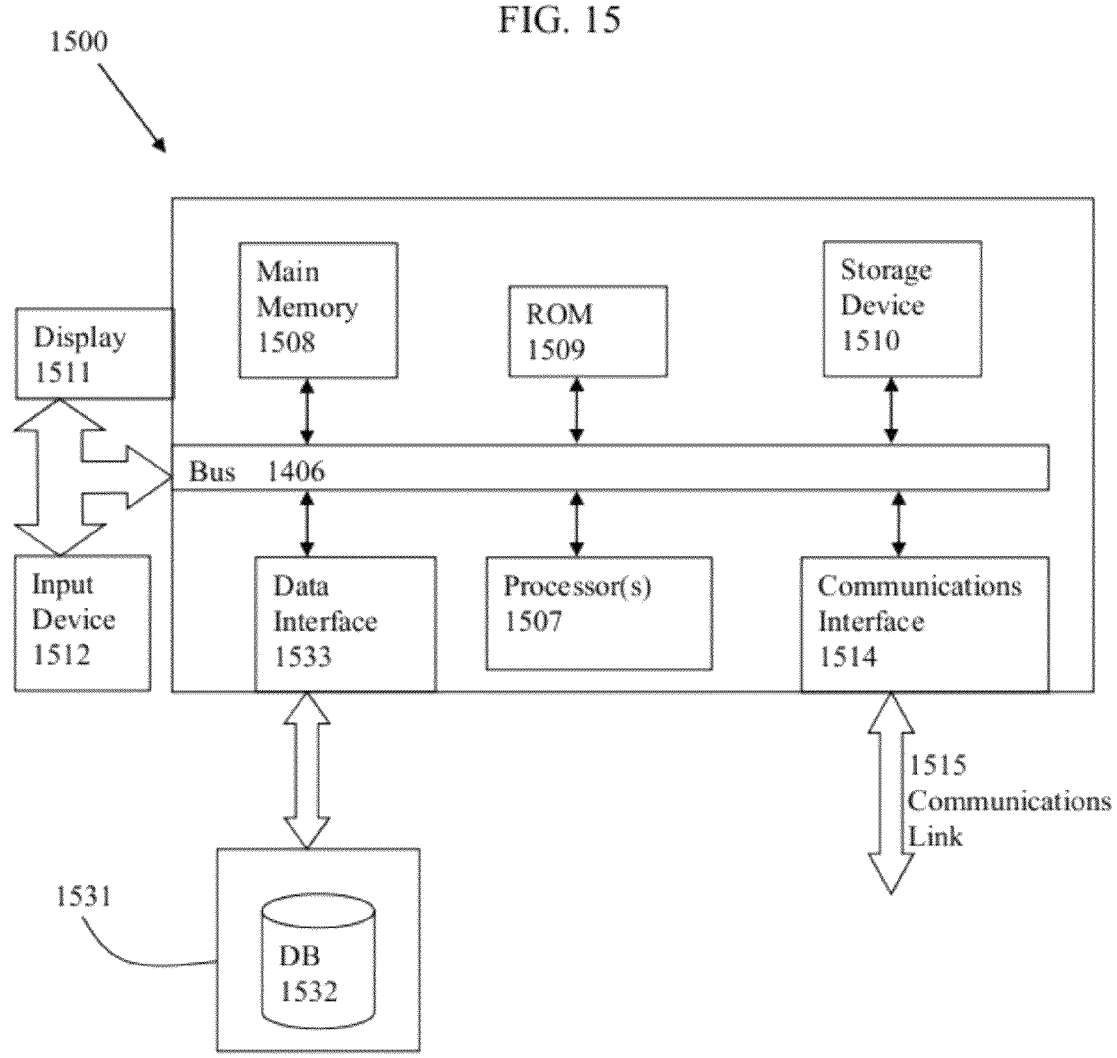
FIG. 15 depicts a computerized system on which a method for implementing full-chip optimization using reduced physical design data may be implemented in some embodiments.

FIG. 15 illustrates a block diagram of an illustrative computing system 1500 suitable for implementing some embodiments of the method or system for implementing electronic circuit designs with electro-migration awareness as described in the preceding paragraphs with reference to various figures. Computer system 1500 includes a bus 1406 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1515 (e.g., modem or Ethernet card), display 1511 (e.g., CRT or LCD), input device 1512 (e.g., keyboard), and cursor control (not shown).

According to one embodiment, computer system 1500 performs specific operations by one or more processor or processor cores 1507, each of which is configured or programmed for execute one or more threads of execution, to execute one or more sequences of one or more instructions contained in system memory 1508. Such instructions may be read into system memory 1508 from another computer readable/usable storage medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1507, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout shapes or nets are created or modified.

The term "computer readable storage medium" or "computer usable storage medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1515 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1515. Received program code may be executed by processor 1507 as it is received, and/or stored in disk drive 1510, or other non-volatile storage for later execution. In an embodiment, the computer system 1500 operates in conjunction with a data storage system 1531, e.g., a data storage system 1531 that contains a database 1532 that is readily accessible by the computer system 1500. The computer system 1500 communicates with the data storage system 1531 through a data interface 1533. A data interface 1533, which is coupled to the bus 1506, transmits and receives electrical, electromagnetic or optical signals that include data streams representing various types of signal information, e.g., instructions, messages and data. In embodiments of the invention, the functions of the data interface 1533 may be performed by the communication interface 1515.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing full-chip optimization across boundaries of a block with reduced physical design data, comprising:
   using at least one processor executing one or more threads of execution to perform a process, the process comprising:
   identifying an original set of physical design data of a physical electronic design that comprises a plurality of blocks;
   generating reduced physical design data of the physical electronic design at least by including a first side instance located on a first path or a first net associated with a block in the physical electronic design;
   performing full-chip optimization or closure using the reduced physical design data of the physical electronic design, wherein
      the reduced physical design data are identified from the physical electronic design by using a partial, incomplete netlist that is not yet completely implemented and is to be physically implemented to complete the physical electronic design for at least a part of the original set of physical design data rather than using logic reduction techniques; and
   merging a change made during the full-chip optimization or closure back to the original set of physical design data.

2. The computer implemented method of claim 1, the process further comprising:
   identifying or generating the reduced physical design data for the physical electronic design.

3. The computer implemented method of claim 2, wherein the act of identifying or generating the reduced physical design data for the physical electronic design comprises:
   identifying an initial netlist of the physical electronic design; and
   identify a path or a net that is associated with a block of the plurality of blocks of the physical electronic design, wherein the path or the net is connected to a component that drives multiple loads.

4. The computer implemented method of claim 3, wherein the component drives multiple loads, and the multiple loads comprises a first set of paths that cross a boundary of the block, and a second set of paths that do not cross the boundary of the block.

5. The computer implemented method of claim 3, wherein the initial netlist is LEC (logic equivalence check) clean.

6. The computer implemented method of claim 1, the process further comprising:
   performing hierarchical exploration;
   partitioning the physical electronic design into a plurality of blocks; and
   assembling the plurality of blocks back into a top level of the physical electronic design.

7. The computer implemented method of claim 1, the process further comprising:
   identifying or generating the reduced physical design data.

8. The computer implemented method of claim 1, the action for identifying the original set of physical design data of the physical electronic design comprising:
   identifying placement information or data for the physical electronic design, wherein the physical electronic design is at a post-placement stage;
   identifying routing information or data for the physical electronic design; and
   identifying a block from a plurality of blocks into which the electronic circuit is partitioned.

9. The computer implemented method of claim 8, the action for identifying the original set of physical design data of the physical electronic design further comprising:
   identifying or determining a physical design data-based interface logic model for the block; and
   replace the block with the physical design data-based interface logic model in the reduced physical design data.

10. The computer implemented method of claim 1, the process further comprising characterizing an electrical characteristic that is associated with an electrical parasitic, wherein the act of characterizing the electrical characteristic that is associated with the electrical parasitic comprises:
    receiving one or more electrical data from a user; and
    determining the electrical characteristic based at least in part upon the one or more electrical data from the user by using a solver.

11. The computer implemented method of claim 1, the act of merging the change made during the full-chip optimization or closure back to the original set of physical design data comprising at least one of:
    resolving placement overlap;
    resolving routing overlap;
    ensuring LEC (logic equivalence check) cleanliness for the full-chip optimization or closure without requiring a separate logic equivalence check after the full-chip optimization or closure;
    accounting for parasitic effects without using a static parasitic file;
    improving timing jump on one or more masked paths in the physical electronic design; and
    improving routing convergence.

12. The computer implemented method of claim 11, wherein the act of resolving placement overlap comprises:
  identifying or determining a closure requirement or constraint;
  identifying or determining a design objective for improving timing jump on a masked path in the reduced physical design data of the physical electronic design;
  identifying or determining a stage of design the physical electronic design is currently at; and
  determining a temporary placement blockage based at least on one of the closure requirement or constraint, the design objective, or the stage of design.

13. The computer implemented method of claim 11, wherein the act of ensuring LEC cleanliness comprises:
  identifying an initial netlist;
  identifying a first side instance or a first side path associated with the side instance;
  determining whether or not the first side instance is to be retained in the reduced physical design data;
  identifying or determining an anchor instance based at least in part the first side instance; and
  anchoring the anchor instance in the reduced physical design data.

14. The computer implemented method of claim 11, wherein the act of accounting for the parasitic effects comprises:
  determining a first set of parasitics by performing extraction on an assembled design of the physical electronic design;
  determining a second set of parasitics by using a routing density maps for one or more masked paths or one or more masked instances of the physical electronic design; and
  accounting for the parasitic effects by using the first set of parasitics and the second set of parasitics.

15. The computer implemented method of claim 11, wherein the act of improving the timing jump comprises:
  identifying a first masked path that exhibits a first order timing effect in the physical electronic design;
  identifying a second masked path that exhibits a second order timing effect in the physical electronic design;
  determining a driving component that drives the first masked path or the second masked path; and
  anchoring the driving component in the reduced physical design data.

16. The computer implemented method of claim 11, wherein the act of improving the routing convergence comprises:
  identifying a first closure requirement or constraint;
  identifying or determining a routing correlation between pre-optimization routing of a partial netlist and post-optimization of the partial netlist; and
  determining a temporary blockage based at least in part upon the routing correlation and the first closure requirement or constraint.

17. The computer implemented method of claim 1, wherein the action of generating the reduced physical design data comprises:
  identifying the first side instance located on the first path or the first net associated with the block of a plurality of blocks of the physical electronic design;
  determining whether or not the first side instance is to be included in the reduced physical design data; and
  including the first side instance for the first path or the first net in the reduced physical design data when the first side instance is determined to be included in the reduced physical design data.

18. The computer implemented method of claim 17, wherein the first side instance is located on the first path, and the first path belongs to the second set of paths.

19. The computer implemented method of claim 17, wherein the act of determining whether or not the first side instance is to be included in the reduced physical design data comprises:
  determining whether or not a change on the path or the net causes a corresponding change in a slew or a delay on the first path on which the first instance is located.

20. The computer implemented method of claim 19, wherein the act of including the first side instance for the path or the net in the reduced physical design data is performed based at least in part on the corresponding change in the slew or the delay.

21. The computer implemented method of claim 17, further comprising:
  identifying a second side instance located on a second path for the path or the net associated with the block;
  determining whether or not the second side instance is to be included in the reduced physical design data; and
  excluding the second side instance for the path or the net in the reduced physical design data.

22. The computer implemented method of claim 21, wherein the second side instance is located on the second path, and the second path belongs to the second set of paths.

23. The computer implemented method of claim 21, wherein the act of determining whether or not the second side instance is to be included in the reduced physical design data comprises:
  determining whether or not a change on the path or the net causes a corresponding change in a slew or a delay on the first path on which the first instance is located, in which the act of excluding the second side instance for the path or the net in the reduced physical design data is performed based at least in part on the corresponding change in the slew or the delay.

24. The computer implemented method of claim 21, further comprising:
  identifying a driver that drives the second side instance; and
  anchoring the driver in the physical electronic design.

25. A system for implementing full-chip optimization across boundaries of a block with reduced physical design data, comprising:
  at least one processor that is at least to:
  identify an original set of physical design data of a physical electronic design that comprises a plurality of blocks;
  generate reduced physical design data of the physical electronic design at least by including a first side instance located on a first path for a path or a net associated with a block in the physical electronic design;
  perform full-chip optimization or closure using the reduced physical design data of the physical electronic design, wherein
    the reduced physical design data are identified from the physical electronic design by using a partial, incomplete netlist that is not yet completely implemented and is to be physically implemented to complete the physical electronic design for at least a part of the original set of physical design data rather than using logic reduction techniques; and
  merge a change made during the full-chip optimization or closure back to the original set of physical design data.

26. The system of claim 25, in which the at least one process is further to:
  identify or generate the reduced physical design data for the physical electronic design;
  perform hierarchical exploration;
  partition the physical electronic design into a plurality of blocks;
  assemble the plurality of blocks back into a top level of the physical electronic design; and
  identify or generate the reduced physical design data.

27. The system of claim 25, wherein the at least one processor that is to identify the original set of physical design data of the physical electronic design is further at least to:
  identify placement information or data for the physical electronic design, wherein the physical electronic design is at a post-placement stage;
  identify routing information or data for the physical electronic design;
  identify a block from a plurality of blocks into which the electronic circuit is partitioned;
  identify or determine a physical design data-based interface logic model for the block; and
  replace the block with the physical design data-based interface logic model in the reduced physical design data.

28. The system of claim 25,
  wherein the at least one processor that is to generate the reduced physical design data is further to:
  identify the first side instance located on the first path for a path or the first net associated with the block of a plurality of blocks of the physical electronic design;
  determine whether or not the first side instance is to be included in the reduced physical design data; and
  include the first side instance for the first path or the first net in the reduced physical design data.

29. The system of claim 28, wherein the at least one processor that is to determine whether or not the first side instance is to be included in the reduced physical design data is further at least to:
  determine whether or not a change on the path or the net causes a corresponding change in a slew or a delay on the first path on which the first instance is located, wherein the at least one processor is to include the first side instance for the path or the net in the reduced physical design data based at least in part on the corresponding change in the slew or the delay;
  identify a second side instance located on a second path for the path or the net associated with the block;
  determine whether or not the second side instance is to be included in the reduced physical design data; and
  exclude the second side instance for the path or the net in the reduced physical design data.

30. The system of claim 29, wherein the at least one processor is further at least to:
  determine whether or not a change on the path or the net causes a corresponding change in a slew or a delay on the first path on which the first instance is located, in which the at least one processor is to exclude the second side instance for the path or the net in the reduced physical design data based at least in part on the corresponding change in the slew or the delay;
  identify a driver that drives the second side instance; and
  anchor the driver in the physical electronic design.

31. An article of manufacture comprising a non-transitory computer readable storage medium having a sequence of instructions stored thereupon which, when executed by at least one processor, causes the at least one processor to perform a method for implementing full-chip optimization across boundaries of a block with reduced physical design data, the method comprising:
  using the at least one processor to perform a process, the process comprising:
  identifying an original set of physical design data of a physical electronic design that comprises a plurality of blocks;
  generating reduced physical design data of the physical electronic design at least by including a first side instance located on a first path for a path or a net associated with a block in the physical electronic design;
  performing full-chip optimization or closure using the reduced physical design data of the physical electronic design, wherein
    the reduced physical design data are identified from the physical electronic design by using a partial, incomplete netlist that is not yet completely implemented and is to be physically implemented to complete the physical electronic design for at least a part of the original set of physical design data rather than using logic reduction techniques; and
  merging a change made during the full-chip optimization or closure back to the original set of physical design data.

32. The article of manufacture of claim 31, the process further comprising:
  identifying or generating the reduced physical design data for the physical electronic design;
  performing hierarchical exploration;
  partitioning the physical electronic design into a plurality of blocks;
  assembling the plurality of blocks back into a top level of the physical electronic design; and
  identifying or generating the reduced physical design data.

33. The article of manufacture of claim 31, the action for identifying the original set of physical design data of the physical electronic design further comprising:
  identifying placement information or data for the physical electronic design, wherein the physical electronic design is at a post-placement stage;
  identifying routing information or data for the physical electronic design;
  identifying a block from a plurality of blocks into which the electronic circuit is partitioned;
  identifying or determining a physical design data-based interface logic model for the block; and
  replace the block with the physical design data-based interface logic model in the reduced physical design data.

34. The article of manufacture of claim 31,
  wherein the action of generating the reduced physical design data comprises:
  identifying the first side instance located on the first path for a path or the first net associated with the block of a plurality of blocks of the physical electronic design;
  determining whether or not the first side instance is to be included in the reduced physical design data; and
  including the first side instance for the first path or the first net in the reduced physical design data.

35. The article of manufacture of claim 34, the act of determining whether or not the first side instance is to be included in the reduced physical design data further comprising:
  determining whether or not a change on the path or the net causes a corresponding change in a slew or a delay on the first path on which the first instance is located, wherein the act of including the first side instance for the path or the net in the reduced physical design data is performed based at least in part on the corresponding change in the slew or the delay;

identifying a second side instance located on a second path for the path or the net associated with the block;

determining whether or not the second side instance is to be included in the reduced physical design data; and excluding the second side instance for the path or the net in the reduced physical design data.

36. The article of manufacture of claim 34, the process further comprising:

determining whether or not a change on the path or the net causes a corresponding change in a slew or a delay on the first path on which the first instance is located, in which the act of excluding the second side instance for the path or the net in the reduced physical design data is performed based at least in part on the corresponding change in the slew or the delay;

identifying a driver that drives the second side instance; and anchoring the driver in the physical electronic design.

\* \* \* \* \*